(12) United States Patent
Beattie et al.

(10) Patent No.: US 11,660,576 B2
(45) Date of Patent: May 30, 2023

(54) HIGH-FLOW, HIGH-PRESSURE INLINE SATURATOR SYSTEM AND METHOD THEREOF

(71) Applicant: GIS Gas Infusion Systems Inc., Saint Andrews (CA)

(72) Inventors: Mike Beattie, Saint Andrews (CA); David Glassford, Saint Andrews (CA)

(73) Assignee: GIS Gas Infusion Systems Inc., Saint Andrews (CA)

( * ) Notice: Subject to any disclaimer, the term of this patent is extended or adjusted under 35 U.S.C. 154(b) by 389 days.

(21) Appl. No.: 16/957,242

(22) PCT Filed: Dec. 27, 2018

(86) PCT No.: PCT/CA2018/051671
§ 371 (c)(1),
(2) Date: Jun. 23, 2020

(87) PCT Pub. No.: WO2019/126877
PCT Pub. Date: Jul. 4, 2019

(65) Prior Publication Data
US 2020/0406203 A1    Dec. 31, 2020

Related U.S. Application Data

(60) Provisional application No. 62/610,675, filed on Dec. 27, 2017.

(51) Int. Cl.
*B01F 3/04*    (2006.01)
*B01F 23/232*    (2022.01)
(Continued)

(52) U.S. Cl.
CPC ...... *B01F 23/2321* (2022.01); *B01F 23/2323* (2022.01); *B01F 23/23121* (2022.01);
(Continued)

(58) Field of Classification Search
CPC ........ B01F 23/237611; B01F 2101/305; B01F 2215/0468; B01F 23/2321;
(Continued)

(56) References Cited

U.S. PATENT DOCUMENTS 2,020,850 A    11/1935    Myhren et al.
6,209,855 B1    4/2001    Glassford
(Continued)

FOREIGN PATENT DOCUMENTS

CH    489609 A    4/1970
EP    1087010 A2    3/2001
(Continued)

OTHER PUBLICATIONS

Written Opinion of the International Search Authority in PCT/CA2018/051671 dated Mar. 18, 2019.
(Continued)

*Primary Examiner* — Charles S Bushey
(74) *Attorney, Agent, or Firm* — Crowe & Dunlevy, P.C.

(57) ABSTRACT

There is provided an inline saturator system and method for gas exchange with an aqueous-phase liquid. The system includes a pressure vessel, configured to receive a first liquid and a first gas from external sources and to discharge a second liquid and a second gas from the pressure vessel, and a gas infusion device situated within the pressure vessel. The gas infusion device is configured to receive the first liquid and first gas, to facilitate gas exchange therebetween, producing the second liquid and the second gas, and to discharge the second liquid and second gas into the pressure vessel. The system further includes a recirculation system configured to direct a portion of liquid within the pressure vessel back into the saturator device, where injection of the redirected liquid into the gas infusion device forces the first liquid into the gas infusion device for the gas exchange.

20 Claims, 28 Drawing Sheets

(51) Int. Cl.
*B01F 23/231* (2022.01)
*B01F 25/51* (2022.01)
*B01F 25/312* (2022.01)
*B01F 33/71* (2022.01)
*B01F 33/81* (2022.01)
*B01F 35/45* (2022.01)
*B01F 35/21* (2022.01)
*B01F 23/237* (2022.01)
*B01F 101/00* (2022.01)

(52) U.S. Cl.
CPC .. *B01F 23/23124* (2022.01); *B01F 25/31233* (2022.01); *B01F 25/31243* (2022.01); *B01F 25/51* (2022.01); *B01F 33/71* (2022.01); *B01F 33/813* (2022.01); *B01F 35/2111* (2022.01); *B01F 35/2113* (2022.01); *B01F 35/451* (2022.01); *B01F 23/231244* (2022.01); *B01F 23/237611* (2022.01); *B01F 2101/305* (2022.01); *B01F 2215/0468* (2013.01)

(58) Field of Classification Search
CPC ............ B01F 23/23121; B01F 23/2323; B01F 23/234244; B01F 23/23124; B01F 25/51; B01F 25/31233; B01F 25/31243; B01F 33/71; B01F 33/813; B01F 35/2111; B01F 35/2113; B01F 35/451
USPC ....... 261/104, 119.1, 122.1, DIG. 7
See application file for complete search history.

(56) References Cited

U.S. PATENT DOCUMENTS

| | | | | |
|---|---|---|---|---|
| 7,537,200 | B2* | 5/2009 | Glassford | B01D 61/246 261/104 |
| 8,608,138 | B2* | 12/2013 | Cooke | B01F 25/314 366/101 |
| 9,527,046 | B1* | 12/2016 | Roe | B01F 35/2113 |
| 10,654,006 | B1* | 5/2020 | Rearden | B01F 23/23 |
| 2003/0054210 | A1* | 3/2003 | Gillett | H01M 8/04228 429/429 |
| 2006/0090651 | A1* | 5/2006 | Liu | C01B 3/503 96/121 |
| 2007/0257378 | A1 | 11/2007 | Spiegel | |
| 2010/0011956 | A1 | 1/2010 | Neumann et al. | |
| 2010/0196994 | A1 | 8/2010 | Van et al. | |
| 2010/0311167 | A1 | 12/2010 | Wood et al. | |
| 2011/0100924 | A1 | 5/2011 | Duesel et al. | |
| 2014/0248192 | A1* | 9/2014 | Burton | B01J 10/00 422/187 |

FOREIGN PATENT DOCUMENTS

| | | |
|---|---|---|
| EP | 1756261 A1 | 2/2007 |
| WO | 2012103601 A1 | 8/2012 |

OTHER PUBLICATIONS

International Search Report in PCT/CA2018/051671 dated Mar. 18, 2019.

* cited by examiner

HIGH-FLOW, HIGH-PRESSURE INLINE SATURATOR SYSTEM AND METHOD THEREOF

TECHNICAL FIELD

The invention relates generally to systems and a method that dissolve gas into a liquid and, more particularly, to inline saturator systems for use in aquaculture.

BACKGROUND

Whether dealing with fish, shell fish, or crustaceans in the aquaculture and wild fisheries industry, it is critical to be able to control the dissolved gas environment in the associated water. In general, there are two issues that must be controlled: maintaining sufficient dissolved oxygen for respiration, and removing the dissolved carbon dioxide resulting from respiration.

It is generally understood that higher levels of dissolved oxygen in the water have a positive influence on the health and growth rate of fish. Within the aquaculture industry, the usual approach to maintaining dissolved oxygen levels involves the injection of oxygen gas through one or more high-pressure venturi nozzles.

While this approach is viable, it also increases the total gas pressure, which in turn, tends to cause the oxygen to bubble out of the water. It is also known that the overall dissolved gas pressure can play a significant role in fish health and growth rate, etc. As such, a further issue concerns the fact that prolonged exposure to an elevated total gas pressure can be a health hazard to the biomass in the water.

SUMMARY

This disclosure provides an inline saturator system for gas exchange with an aqueous-phase liquid, the system comprising:

a pressure vessel configured to receive a first liquid and a first gas from external sources, and to discharge a second liquid and a second gas from the pressure vessel;

a gas infusion device situated within the pressure vessel, the gas infusion device configured to receive the first liquid and first gas, to facilitate gas exchange between the first liquid and first gas, producing the second liquid and the second gas, and to discharge the second liquid and second gas into the pressure vessel; and a recirculation system configured to redirect a portion of liquid within the pressure vessel back into the saturator device;

wherein injection of the redirected liquid into the gas infusion device forces the first liquid into the gas infusion device for the gas exchange.

This disclosure also provides a method for gas exchange with an aqueous-phase liquid, the method comprising:

injecting a first liquid and a first gas into a pressure vessel;

directing the first liquid and the first gas through a gas infusion device situated within the pressure vessel, the gas infusion device configured to facilitate gas exchange between the first liquid and the first gas, producing a second liquid and a second gas;

redirecting a portion of the second liquid back into the saturator device; and discharging the remaining second liquid out of the pressure vessel;

wherein the redirection of the second liquid into the gas infusion device draws the first liquid into the gas infusion device for the gas exchange.

Advantages and features of the invention will become evident upon a review of the following detailed description and the appended drawings, the latter being briefly described hereinafter.

BRIEF DESCRIPTION OF THE DRAWINGS

Reference will now be made, by way of example, to the accompanying drawings which show an example of the present application, in which.

DETAILED DESCRIPTION OF THE EXEMPLARY EMBODIMENTS SHOWN IN THE DRAWINGS

Figure 1:
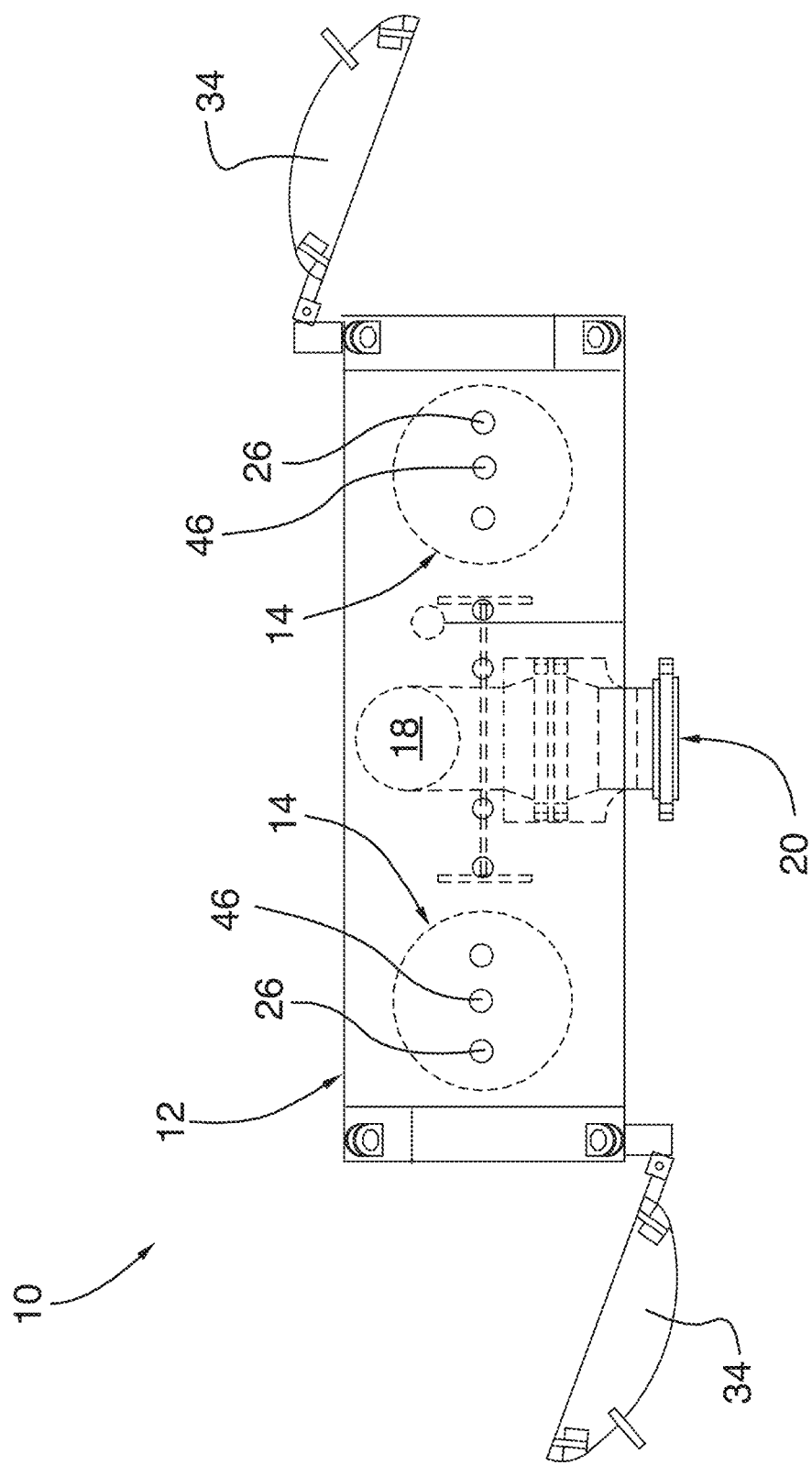
FIG. 1 is a plan view of a saturator system according to an example of the present invention with access doors in the open position.
Figure 2:
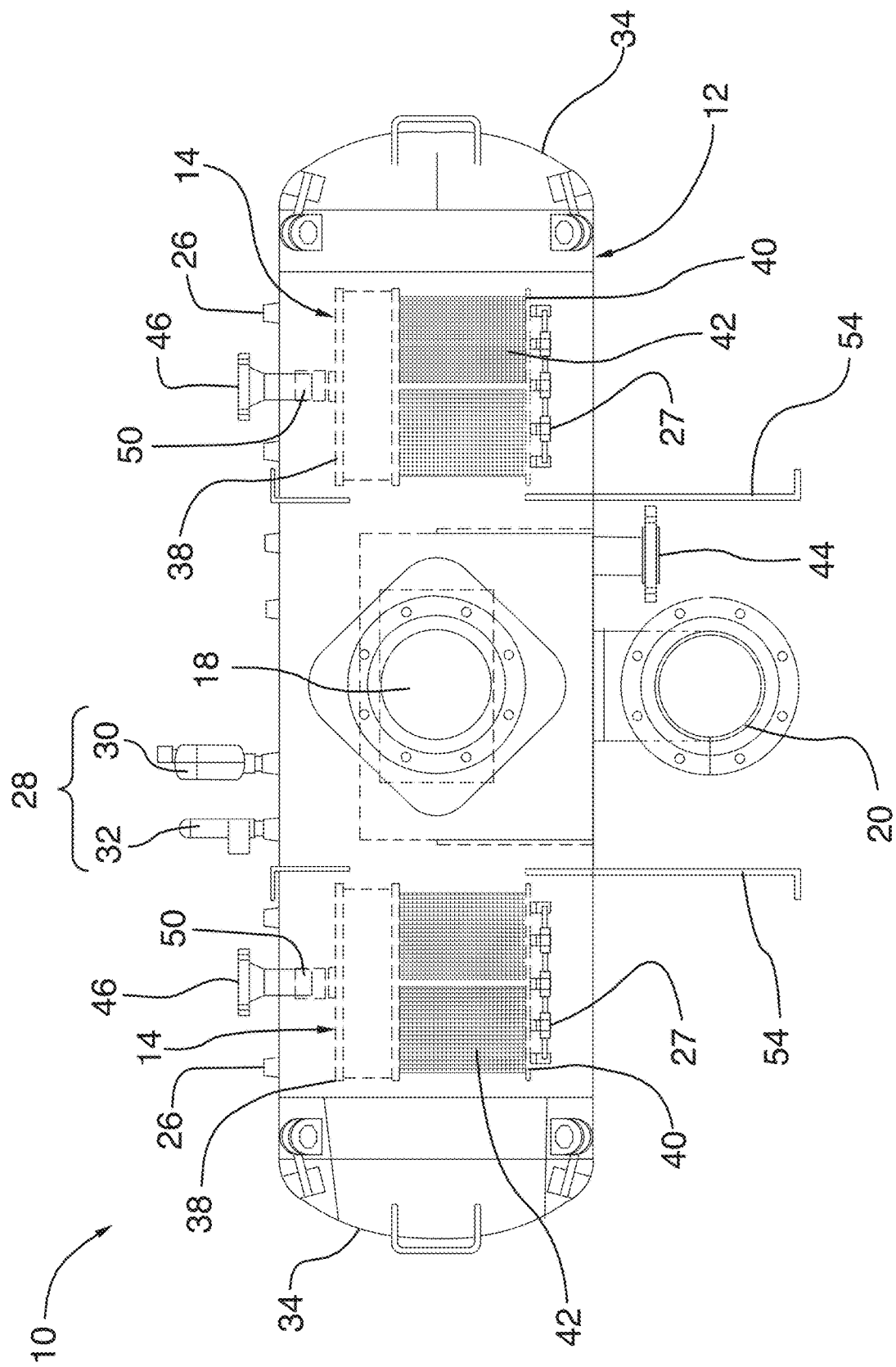
FIG. 2 is a front view of the saturator system of FIG. 1 with the internal components shown in dashed lines and the access doors in the closed position.
Figure 3:
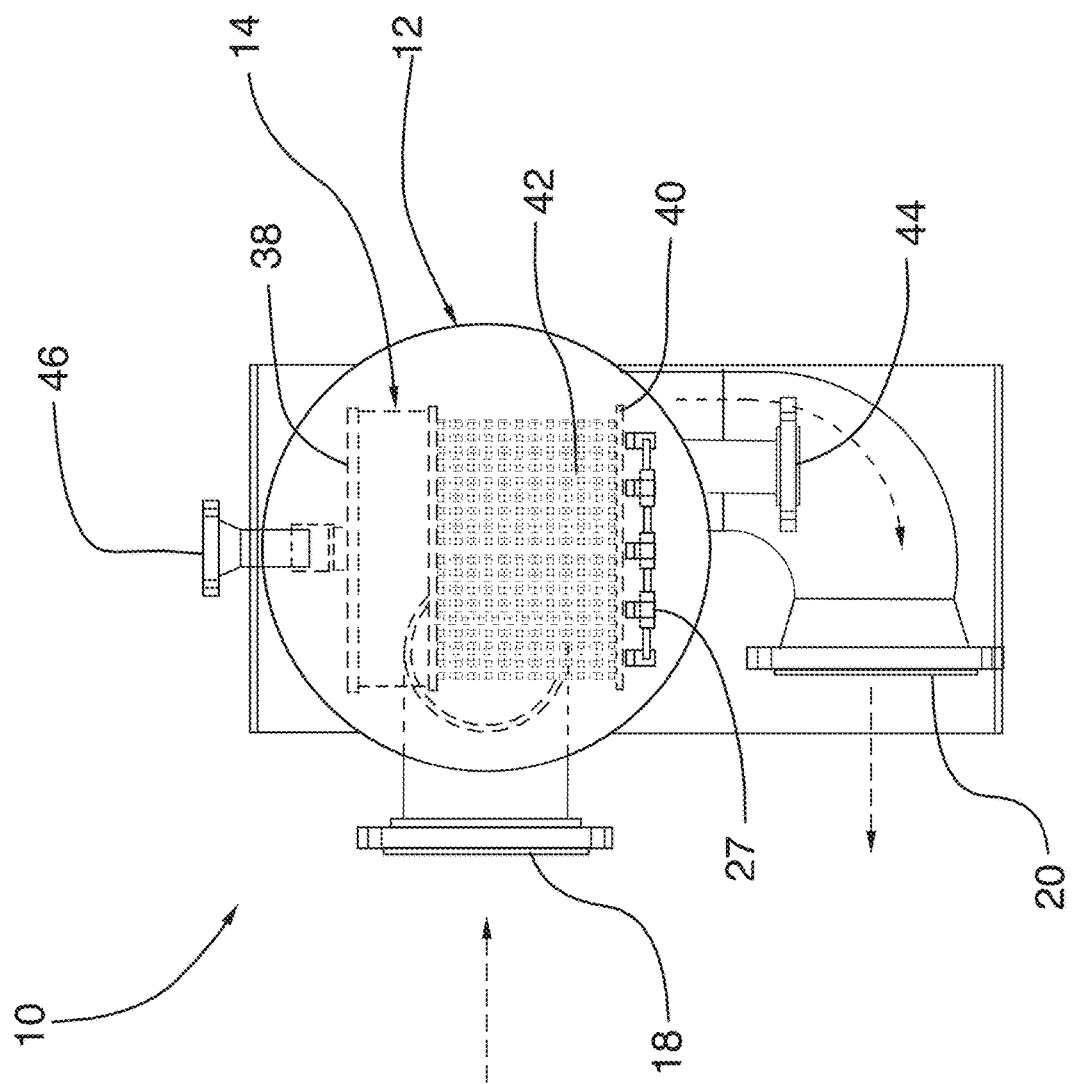
FIG. 3 is a right side view of the saturator system of FIG. 2 with the internal components shown in dashed lines.
Figure 4:
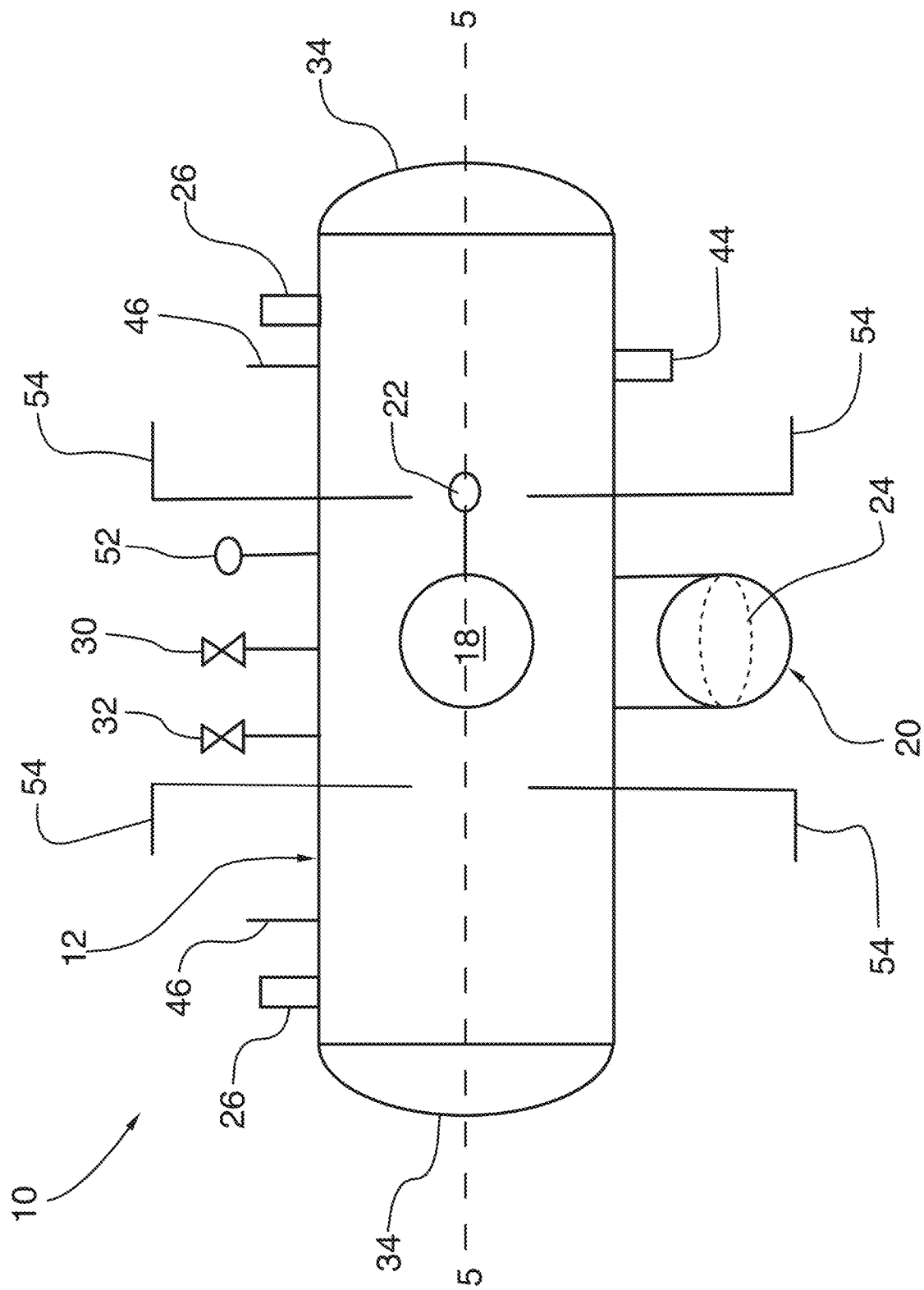
FIG. 4 is a schematic view of the saturator system of FIG. 2.
Figure 5:
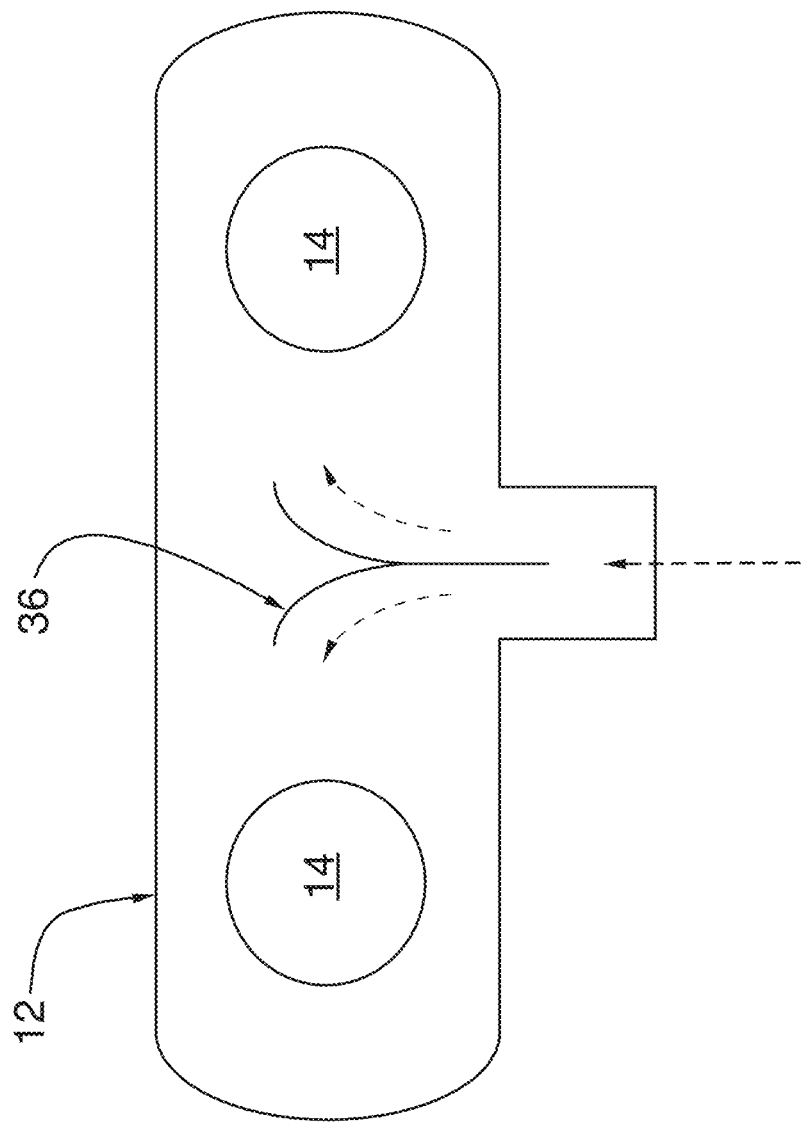
FIG. 5 is a cross-sectional, plan view of the saturator system of FIG. 4 along line 5-5.

An example embodiment of a saturator system 10, a double array saturator system 100, and methods of their use will be discussed. Saturator system 10 will first be described.

Saturator System

As shown in FIGS. 1-6, saturator system 10 generally includes a pressure vessel 12, two saturation devices 14, a recirculation system 16, and a control system.

Pressure vessel 12 in this example embodiment is generally cylindrical in shape, having a 2.15 meter length with a diameter of 0.61 meters. Pressure vessel 12 comprises an input port 18 situated in the middle of pressure vessel 12 for receiving a first liquid from an external source and an output port 20 for discharging a second liquid that is different from the first liquid, from pressure vessel 12. Output port 20 is positioned below input port 18, external to pressure vessel 12. Overall, saturator system 10 has a height of about 1.023 meters.

Input port 18 is covered by a shut-off valve (not shown) and downstream from input port 18 is positioned a flow rate sensor 22 for monitoring the flow of the first liquid into pressure vessel 12. Output port 20 is also covered by a back-pressure control valve 24 positioned upstream of output port 20 for maintaining fluid pressure within pressure vessel 12. Both input port 18 and output port 20 each have a diameter of about 0.203 meters.

Pressure vessel 12 includes a gas inlet 26 for receiving a first gas, and a gas outlet 28 for discharging a second gas, that is different from the first gas, from pressure vessel 12. Gas inlet 26 is further in fluid communication with gas manifolds 27 situated within pressure vessel 12. Gas manifolds 27 are situated adjacent to and are in fluid communication with saturator devices 14. Saturator device 14 is also referred herein to as a gas infusion device.

Gas outlet 28 in the depicted embodiment includes an air eliminator 30 and a pressure relief valve 32, both in fluid communication with pressure vessel 12. Both are adapted to transfer gas from within pressure vessel 12 to the atmosphere.

Pressure vessel 12 is made of a steel alloy, particularly 316 stainless steel, to enable it operate in a salt-water environment. Further, pressure vessel 12 is an ASME-certified pressure vessel, rated for an operating pressure of 100 psi.

Pressure vessel 12 has two pressure-rated doors 34 with seals. Doors 34 cover openings on opposed sides of pressure 12, through which a user may access the internal space within pressure vessel 12 for cleaning and maintaining of components inside pressure vessel 12.

A mechanical means, or a baffle 36, is further situated within pressure vessel 12. Baffle 36 is adapted to mechanically direct the first liquid from input port 18 to saturator devices 14.

Saturator devices 14 are situated within pressure vessel 12 and are positioned on either side of input port 18, orientated generally parallel with one another. Each gas infusion device 14 has a first end portion 38, for receiving the first liquid and discharging the second gas, and an opposed second end portion 40 for receiving the first gas and discharging the second liquid into pressure vessel 12. Each gas infusion device 14 further has a fibre module array 42 situated between the end portions where fibre module array 42 is made up of a polymer coated microporous fiber material. In the present embodiment, saturator devices 14 are the saturator or gas infusion device disclosed in U.S. Pat. No. 7,537,200, to Glassford, Oct. 31, 2003.

Recirculation system 16 includes a suction nozzle 44 and two discharge nozzles 46, which are all in fluid communication with pressure vessel 12.

Suction nozzle 44 is positioned proximate second end portion 40 of gas infusion device 14 to draw a portion of liquid into recirculation system 16. One discharge nozzle 46 is positioned adjacent each first end portion 38 of each gas infusion device 14 to inject the portion of liquid back into gas infusion device 14.

Recirculation system 16 includes a pump 48 (see FIGS. 6-8) operatively coupled between suction nozzle 44 and discharge nozzles 46, pump 48 being adapted to drive fluid from suction nozzle 44 to discharge nozzles 46.

Recirculation system 16 further includes two eductors 50, one eductor 50 operatively coupled between each discharge nozzle 46 and its corresponding gas infusion device 14.

Eductors 50 are made of metal, and in the present embodiment, made of 316 stainless steel. In this manner, eductors 50 are adapted to operate in a high-pressure, salt-water environment.

The control system (not shown) is operatively coupled to the flow rate sensor 22 and back-pressure control valve 24. The control system further includes a pressure sensor 52 situated within pressure vessel 12, which is adapted to measure the fluid pressure within pressure vessel 12, and a regulator (not shown) on gas inlet 26.

Saturator system 10, has mounts 54 fixed to, and extending from, pressure vessel 12. Mounts 54 are mechanical means which allow saturator system 10 to be secured to the ground, a vertical wall and/or to another saturator system 10 as described below.

Whereas a specific embodiment of saturator system 10 is herein shown and described, variations are possible. In some examples, pressure vessel 12 contains two or more gas inlets 26, two or more air eliminators 30, and/or two or more suction nozzles 44.

In other examples, rather than a two saturator devices 14, pressure vessel 12 may instead house one or more than two saturator devices 14.

As well, instead of the saturator devices being positioned side-by-side and orientated parallel with one another in an upright position (i.e. linear horizontally) within pressure vessel 12, in other examples, the multiple saturator devices 14 are oriented in one of the following ways: linear vertical, planar horizontal, planar vertical, or arbitrarily.

In other examples, rather than using a single pump, saturator system 10 includes two or more pumps as part of its recirculation system 16.

Double Array Saturator System

Figure 6:
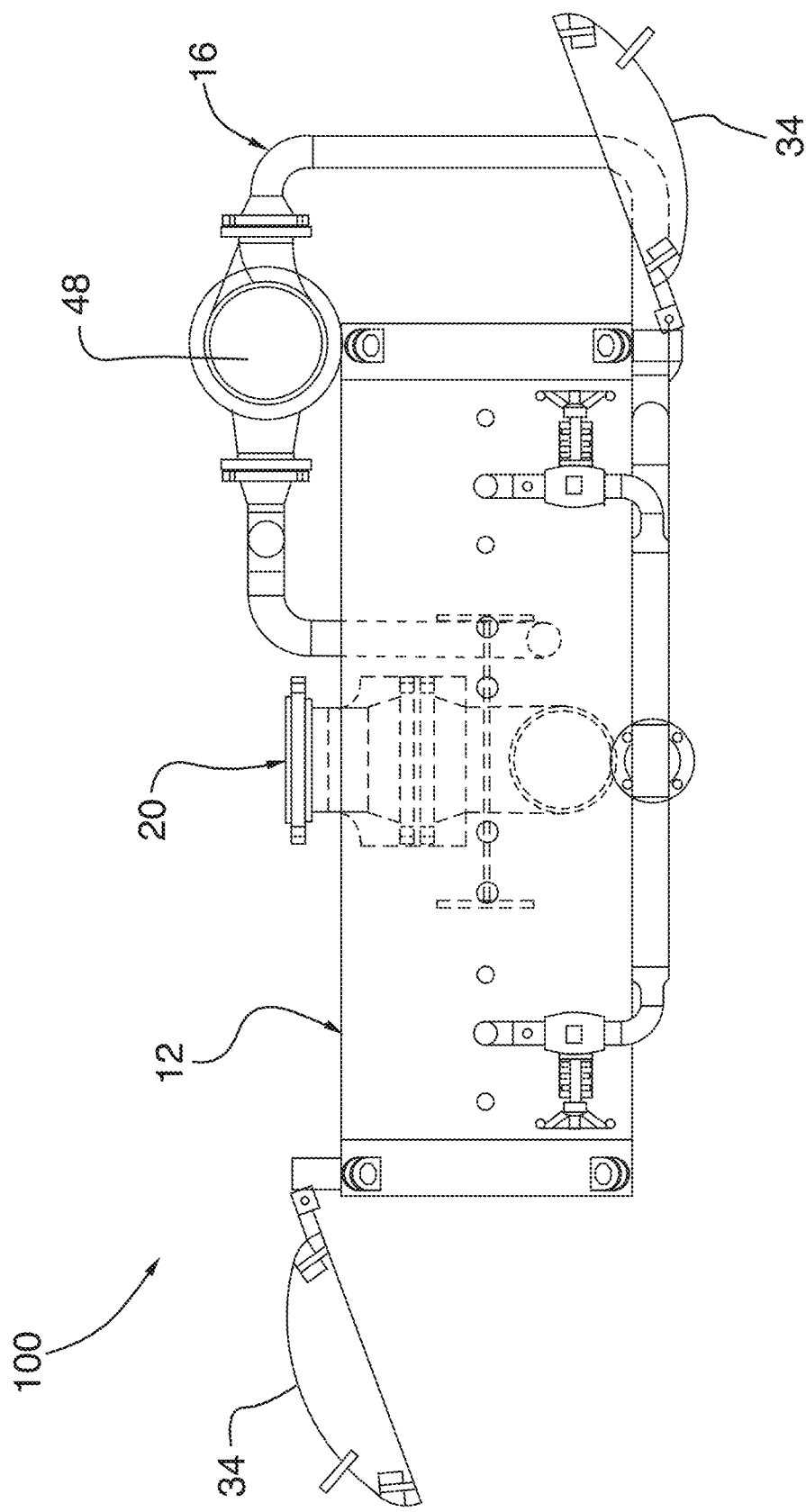
FIG. 6 is a plan view of a double array saturator system according to another example of the present invention with access doors in the open position.
Figure 7:
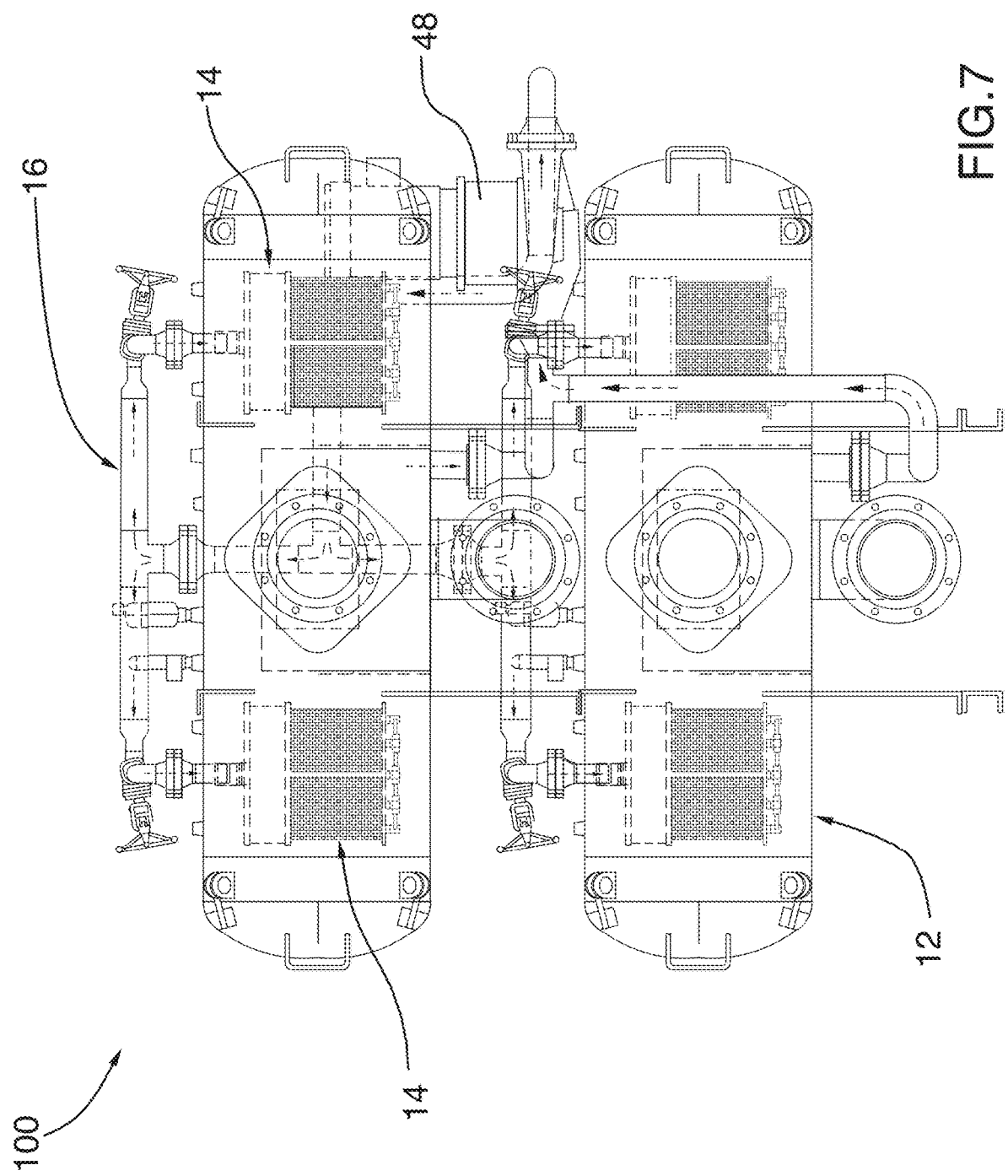
FIG. 7 is a front view of the saturator system of FIG. 6 with the internal components shown in dashed lines and the access doors in the closed position.
Figure 8:
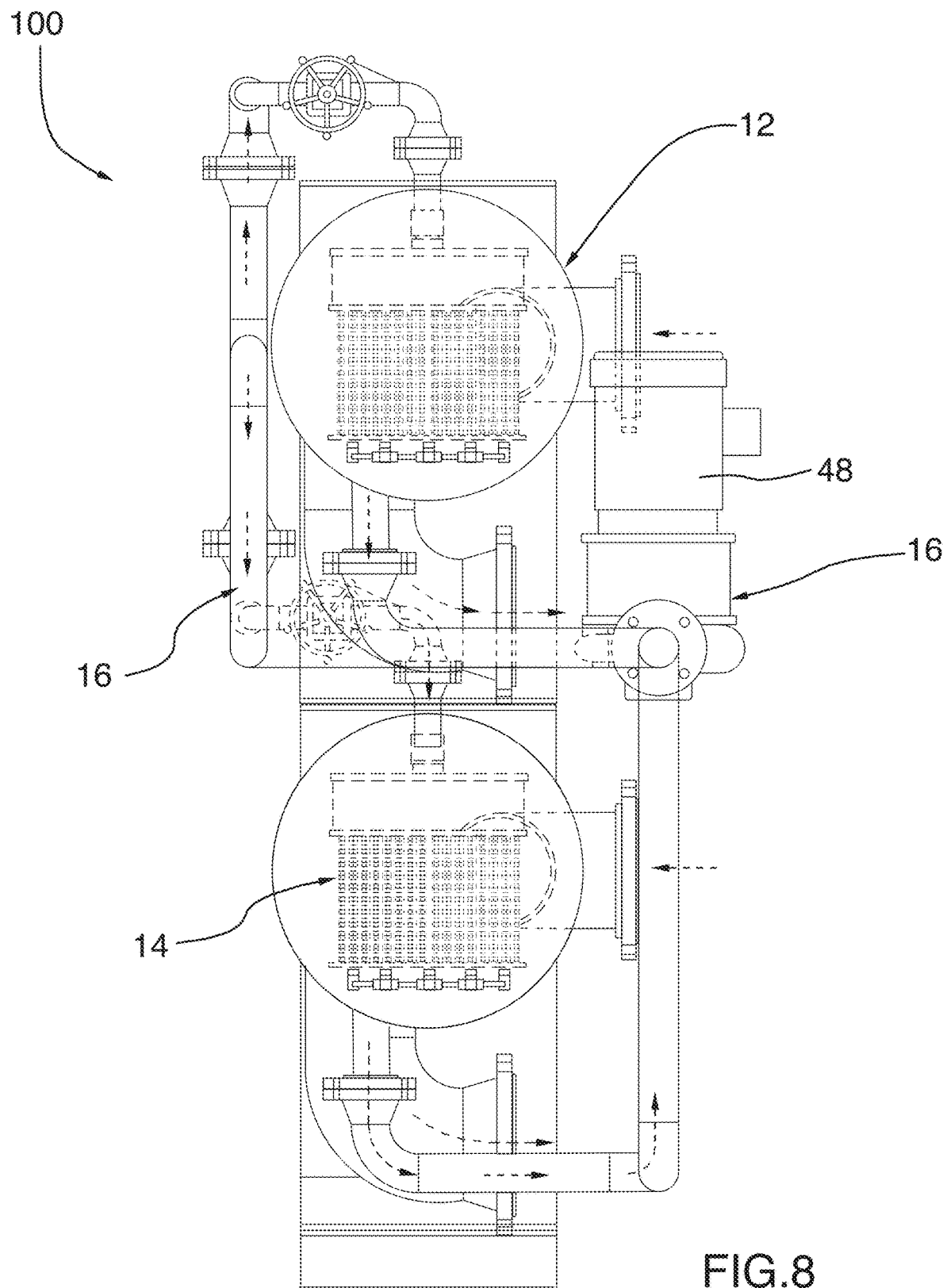
FIG. 8 is a left side view of the saturator system of FIG. 7 with the internal components shown in dashed lines.

As shown in FIGS. 6-8, double array saturator system 100 generally includes two saturator systems 10 with a shared recirculation system 16 and a common pump 48. Mounts 54 allow one pressure vessel 12 to be secured on top of or above the other pressure vessel 12.

In the shown embodiment, each pressure vessel 12 houses two saturator devices 14 therein. Each pressure vessel 12 also has its own corresponding suction nozzle 44 and two discharge nozzles 46, which are all in direct fluid communication with pump 48.

Whereas a specific embodiment of double array saturator system 100 is herein shown and described, variations are possible.

In some examples, each pressure vessel 12 and saturator devices 14 may be varied as noted above.

In others examples, instead of pressure vessels 12 being positioned one on top of the other in parallel (i.e. linear vertically), in other examples, the multiple pressure vessels 12 are oriented in one of the following ways: linear horizontal, planar horizontal, planar vertical, or arbitrarily.

Double array saturator system 100 may instead have two recirculation systems 16 (with a pump 48 each), one operatively coupled to each pressure vessel 12.

Independent Use

Both saturator system 10 and double array saturator system 100 are for use in conducting a gas exchange with an aqueous-phase liquid inline with a tank of water. While the tank is not shown, both saturator system 10 and double array saturator system 100 are understood to be coupled to the tank with piping extending from their input ports 18 and output ports 20. Movement of liquid through the use of systems 10 and 100 are indicated by dashed arrows in the Figures. While not shown in the drawings, the saturator systems may also be used in a contained, open body of water.

The first liquid is injected into pressure vessel 12 through input port 18, and directed towards first end portion 38 of saturator devices 14 by baffle 36. The first gas is also injected into vessel 12 through gas inlet 26 and directed to gas manifolds 27, which are adjacent second end portion 40 of each gas infusion device 14.

Simultaneously, a portion of fluid that is proximate second end portion 40 of gas infusion device 14 is drawn by pump 48 through suction nozzle 44. The portion of fluid is redirected and pumped through discharge nozzles 46 and through eductors 50, which are positioned adjacent first end portion 38 of saturator devices 14. The force of the redirected fluid as it travels through eductor 50 draws and drives the first liquid into first end portion 38 of gas infusion device 14.

In gas infusion device 14, the first liquid and the first gas interact with the fibre module array, which facilitate a gas exchange between the first liquid and first gas as both fluids travels through gas infusion device 14. This exchange produces the second liquid and the second gas, which are both discharged from second end portion 40 of gas infusion device 14 into the pressure vessel.

While most of the second liquid will be then discharged from pressure vessel 12 through output port 20, some of the second liquid will be drawn by pump 48 through suction nozzle 44 into recirculation system 16. This liquid is then redirected to first end portion 38 of gas infusion device 14 through discharge nozzle 46. This redirected second liquid will then be pumped through eductor 50 and used to draw the first liquid into gas infusion device 14 for the gas exchange.

As noted above, both saturator system 10 and double array saturator system 100 are adapted for operation under pressure. In that regard, the control system uses information from flow rate sensor 22 and pressure sensor 52 to maintain the pressure within pressure vessel 12 at a predetermined level. The control system drives back pressure control valve 24 and pump 48 in order to maintain sufficient head to drive fluid through gas infusion device 14 and to maintain fluid pressure under low-flow conditions. In the present embodiment, the control system drives pump 48 so as to ensure that the pressure in gas infusion device 14 is at least 20 psi.

The control system also uses information from flow rate sensor 22 to determine the amount of the first gas required by each gas infusion device 14. The control system controls the regulators connected to gas inlets 26 on pressure vessel 12. The control system may be configured to detect the vibration of pump 48 in order to monitor the pump's mechanical health.

In order to maintain a generally stable total gas pressure, the second gas is released through air eliminator 30 to the atmosphere. For safety, pressure relief valve 32 may also be used to further release gases from pressure vessel 12 into the atmosphere.

Whereas a specific embodiment of the method is herein shown and described, variations are possible.

In other examples, the control system drives pump 48 may be adapted to ensure that the pressure in saturator system 10 is up to 65 psi.

Combined Use

Both saturator system 10 and double array saturator system 100 may be used simultaneously with one or more lift pumps situated within the body of water.

The lift pumps are configured to remove carbon dioxide gas from the water. An example of such a lift pump is disclosed in U.S. 62/607,385. Each lift pump includes a gas input and perforations to enable water to enter the lift pump.

The perforations are situated on a plate for gas to pass through, where the plate positioned upstream from a mixing chamber, through which water enters the lift pump and where the gas forms bubbles which improve gas lift. The perforated plate is made by additive manufacturing with precise hole dimensions and hole spacing.

As the gas is bubbled into the water through the plate, it reduces the water density so that the water rises through the lift pump, thus enabling more water to enter through the perforations. As the water rises, dissolved $CO_2$ in the water is exchanged with the injected air based on Henry's Law, such that the partial pressure of dissolved $CO_2$ in the water will work to match the partial pressure of $CO_2$ in the air.

Used together in this manner, the saturator system oxygenates the body of water, while the one or more lift pumps remove the dissolved $CO_2$ and remediates the ammonia to form nitrate.

Such a system may further include one or more oxygen tanks connected to the saturator system for supplying oxygen to the saturator system, and a compressor coupled to lift pumps to supply ambient air to generate the lift.

Such a system may also have a gas regulator operatively coupled between the oxygen tanks and the saturator system to regulate the flow of gas into the saturator system, a dissolved oxygen sensor positioned within the body of water, a saturator feed pump in fluid communication with the body of water, adapted to draw and direct water from the body of water into the saturator system, and an ammonia sensor positioned within the body of water.

A control and monitoring system may be in place to communicate with, control and coordinate each of the above components. For example, the compressor can be activated to engage the lift pumps in response to the detected concentration of ammonia rising above a maximum level. The compressor may then be disengaged to deactivate the lift pumps in response to the detected concentration of ammonia falling below a minimum level. In a similar manner, the gas regulator and the saturator feed pump may be activated and controlled in response to the detected concentration of oxygen falling below a minimum level. The gas regulator and the saturator feed pump may also be deactivated accordingly.

Whereas a specific embodiment of the method is herein shown and described, variations are possible.

Testing

The following tests were conducted. The first gas used was oxygen and the first liquid was oxygen-poor and carbon dioxide-rich saltwater or oxygen-poor and carbon dioxide-rich freshwater.

Requirements

Tank of water

Discharge Pipes

Suction pipe

Recirculation pump

Pressure control valve

Variable speed pump(s)

Oxygen source

Measuring equipment (Oxygen, total gas pressure, temperature, Salinity, pressure, Oxygen flow, water flow)

The tests were set up by connecting the suction and discharge pipes, respectively, to the inlet port and the outlet port of the saturator system, the other ends of the pipes were placed in the tank of water, on opposite sides of the tank to ensure good circulation of oxygenated water. The pressure control valve is positioned between the saturator system and the discharge pipe to the tank.

Background measurements of the water tank were taken, noting salinity, temperature, total gas pressure and oxygen readings.

A small amount of oxygen is fed to the unit to keep the fibers of the saturator devices clear of water.

The variable speed pumps are then turned on to allow water from the tank to flow into and fill the pressure vessel and the pipes.

The pressure control valve is partially closed to increase the pressure within the pressure vessel to the desired level.

By adjusting the water flow and pressure within the pressure vessel, the desired predetermined parameters are eventually achieved. The parameters for the trials are set out in Table 1 below.

The recirculation pump is then turned on and increased until there is at least 30 PSI differential between the recirculation pump pressure and the unit pressure.

The oxygen is turned on at the desired level.

The saturator system was then run for the predetermined desired time.

The saturator system is then shutdown in reverse order, i.e. first the oxygen is turned off, then the recirculation pump, and then pressure.

Readings are taken for oxygen, temperature, and total gas pressure and compared to the previous values. Previous values are those of water at sea level, that being 100% oxygen saturation, 15 Degrees C., at 760 mmHg (100% total gas pressure). If the tank did not mix properly, several locations will have to be measured to get a full profile on the tank.

Based on these comparisons, it was determined how much oxygen was added to the water and how much other gas was removed.

A number of tests were run according to the following rationale, and the results illustrated in the noted Figures.

Figure 9:
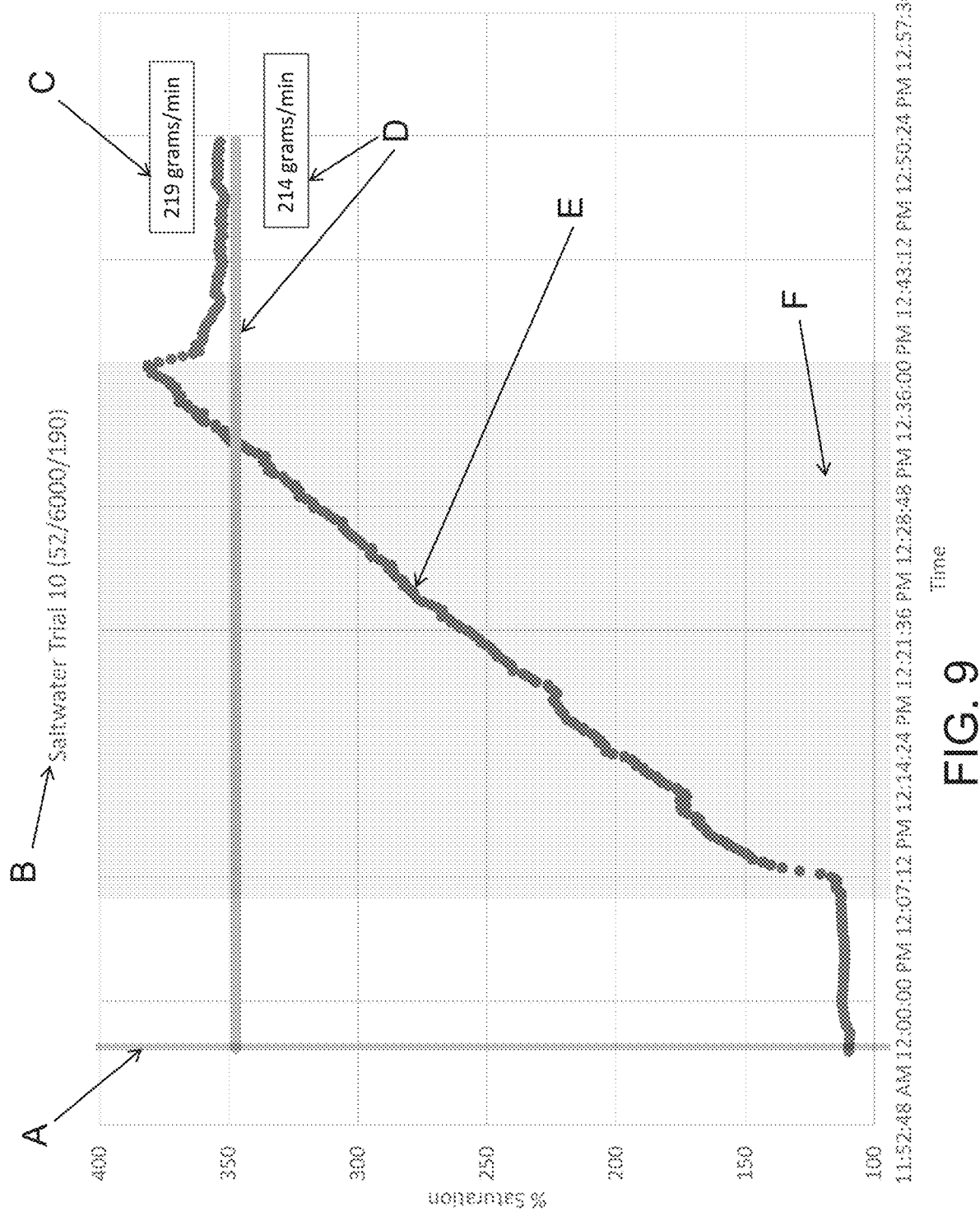
FIG. 9 is a sample graph explaining the elements of the graphs in the subsequent Figures.
Figure 10:
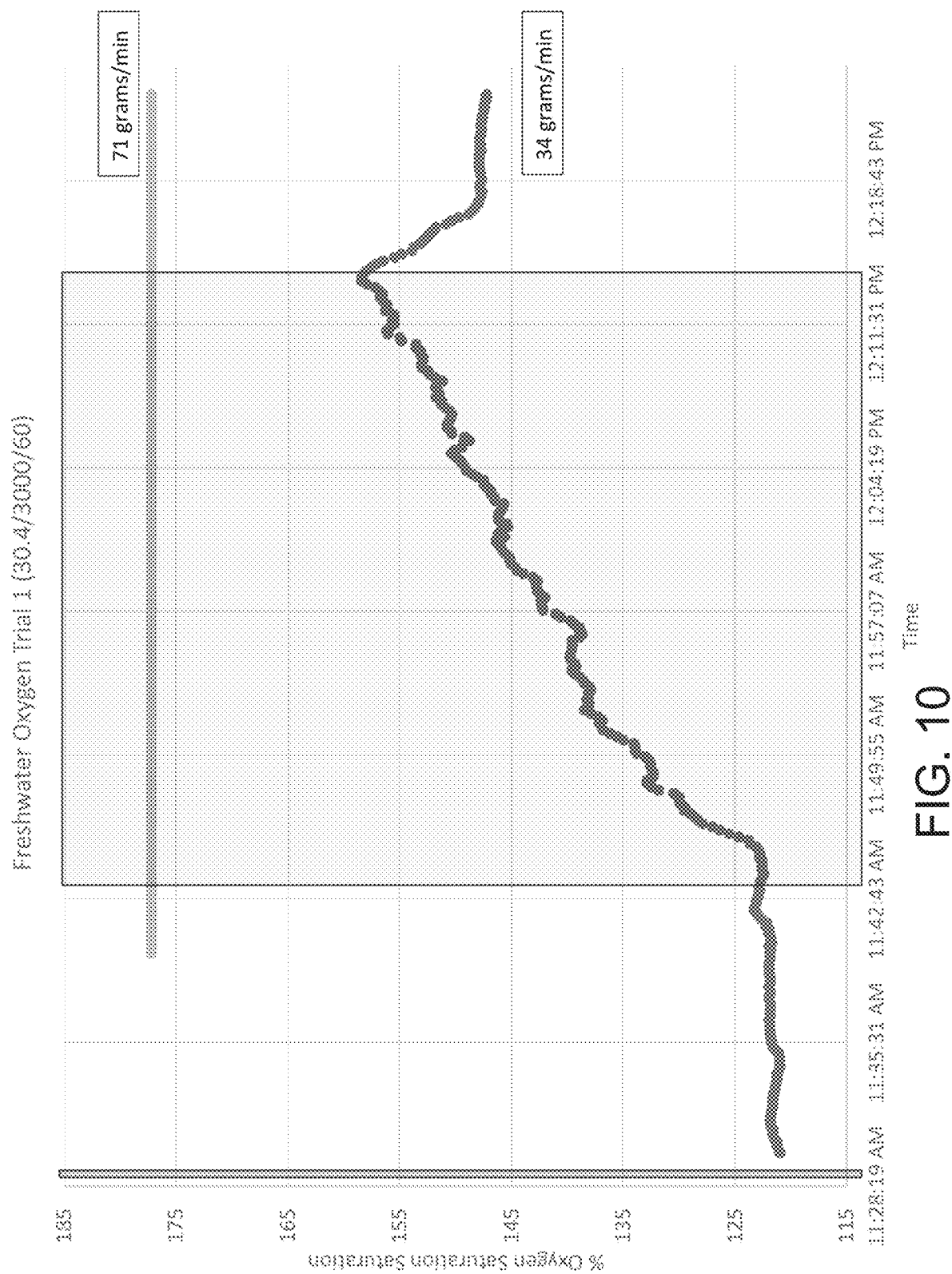
FIGS. 10-28 show oxygen percent saturation graphs using the saturator system of FIG. 6.
Figure 11:
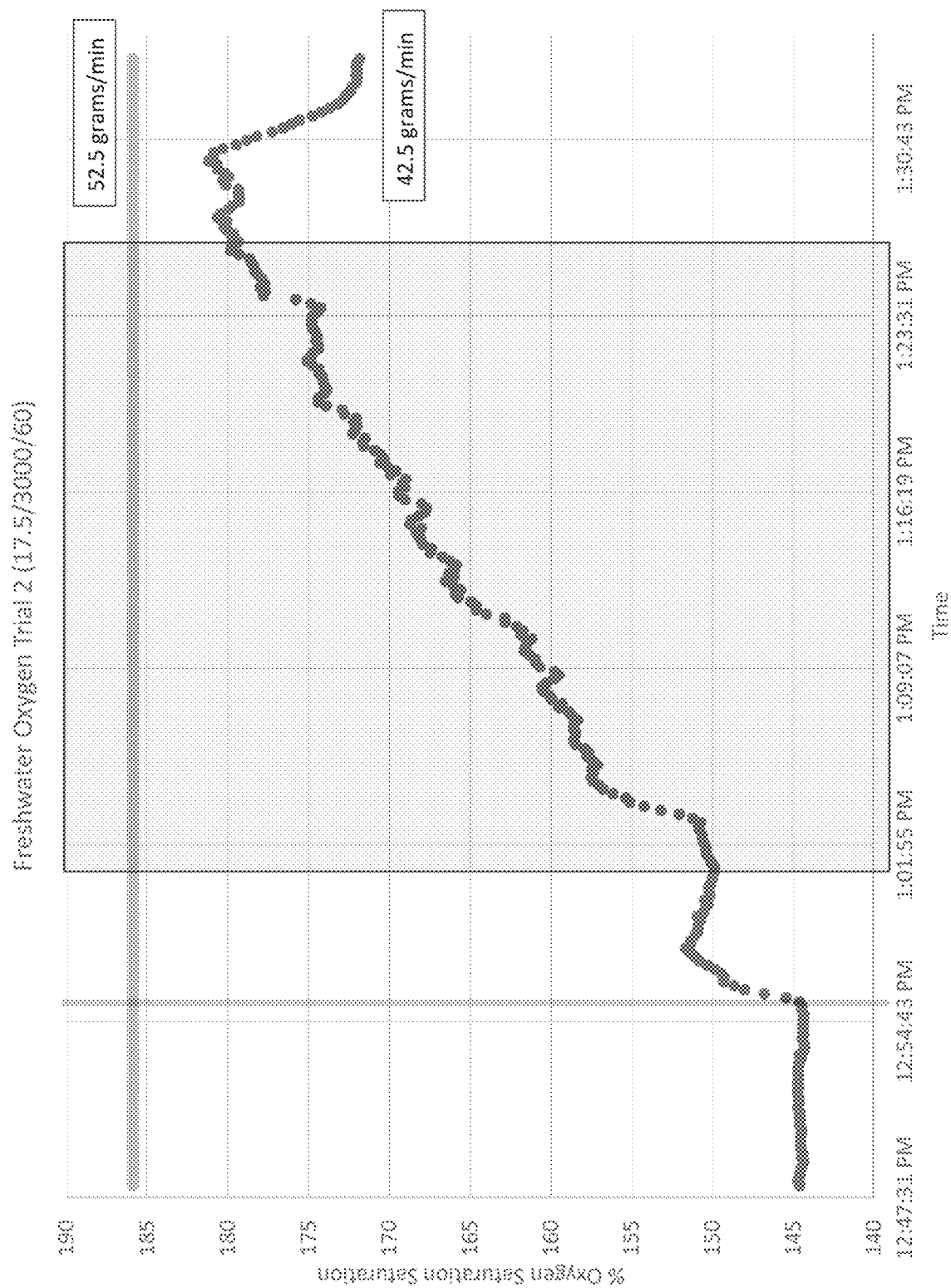
Figure 12:
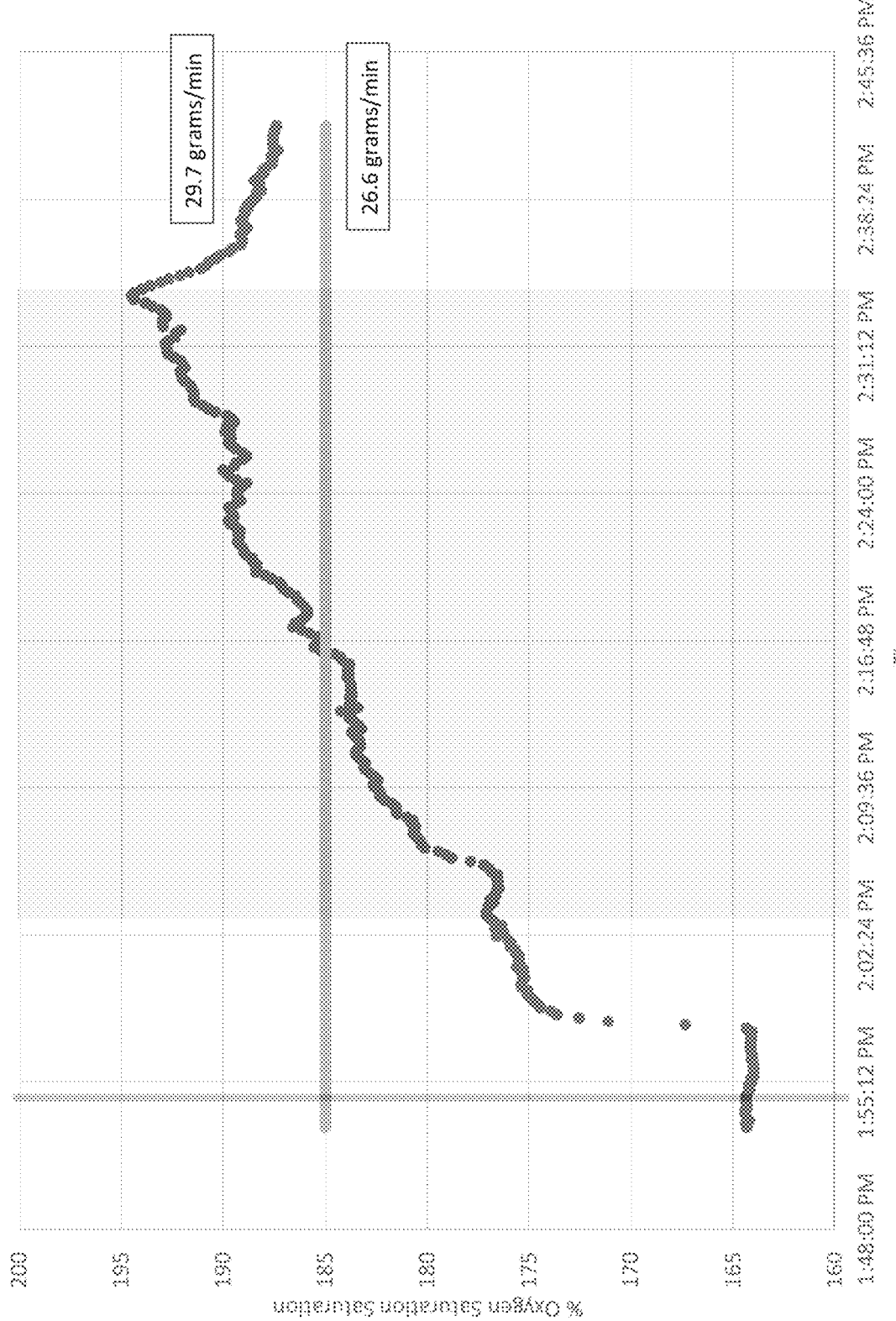
Figure 13:
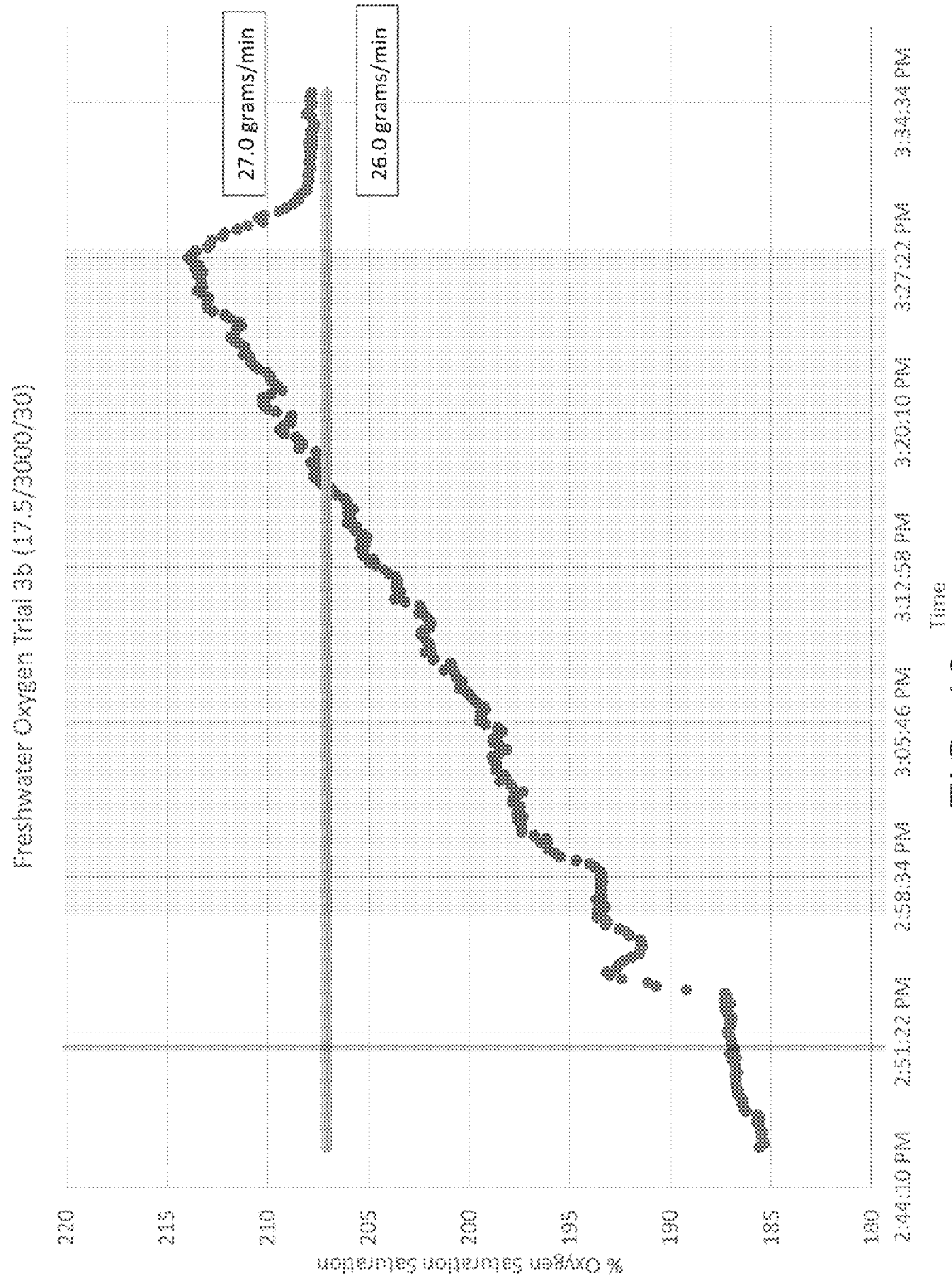
Figure 14:
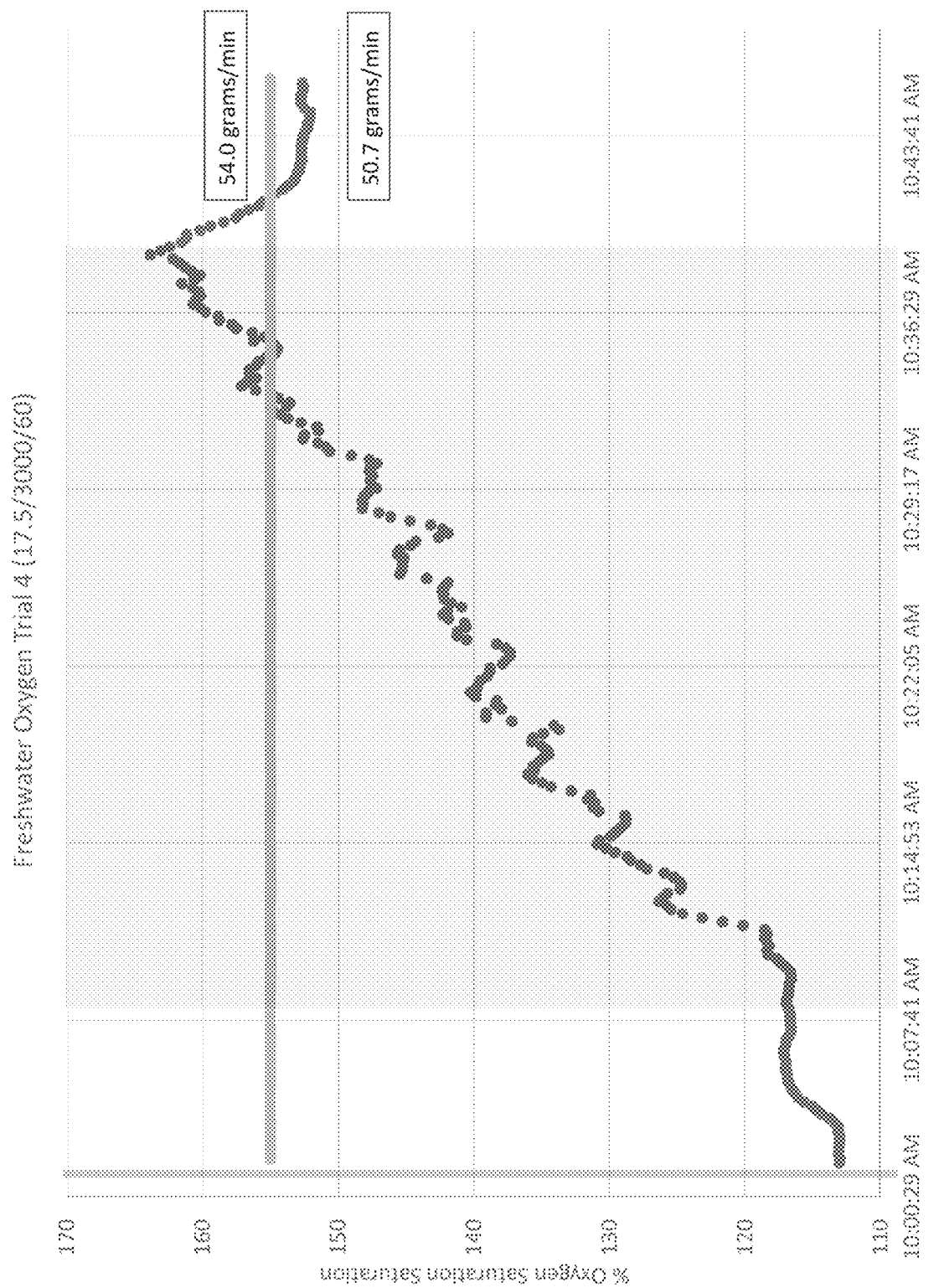
Figure 15:
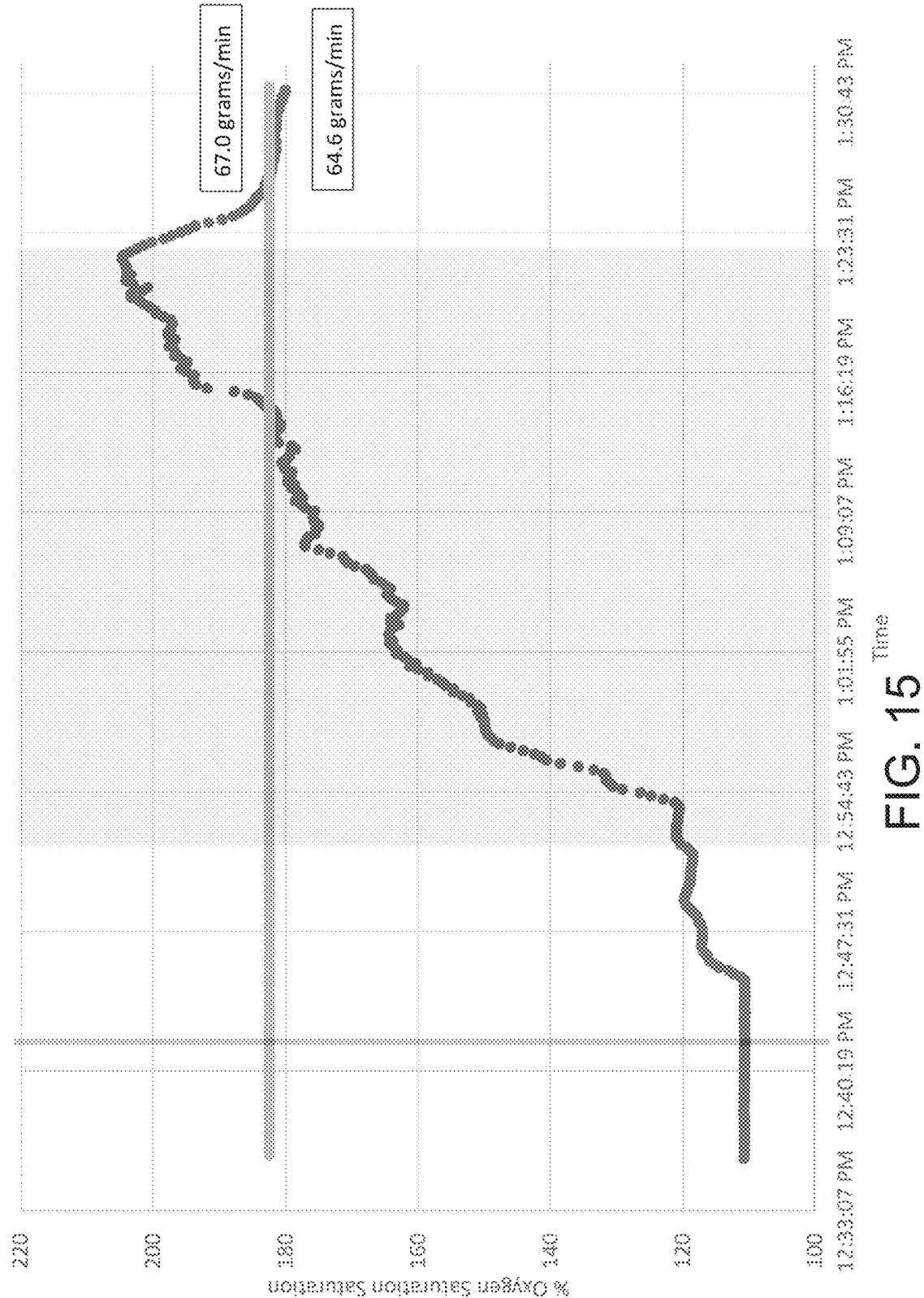
Figure 16:
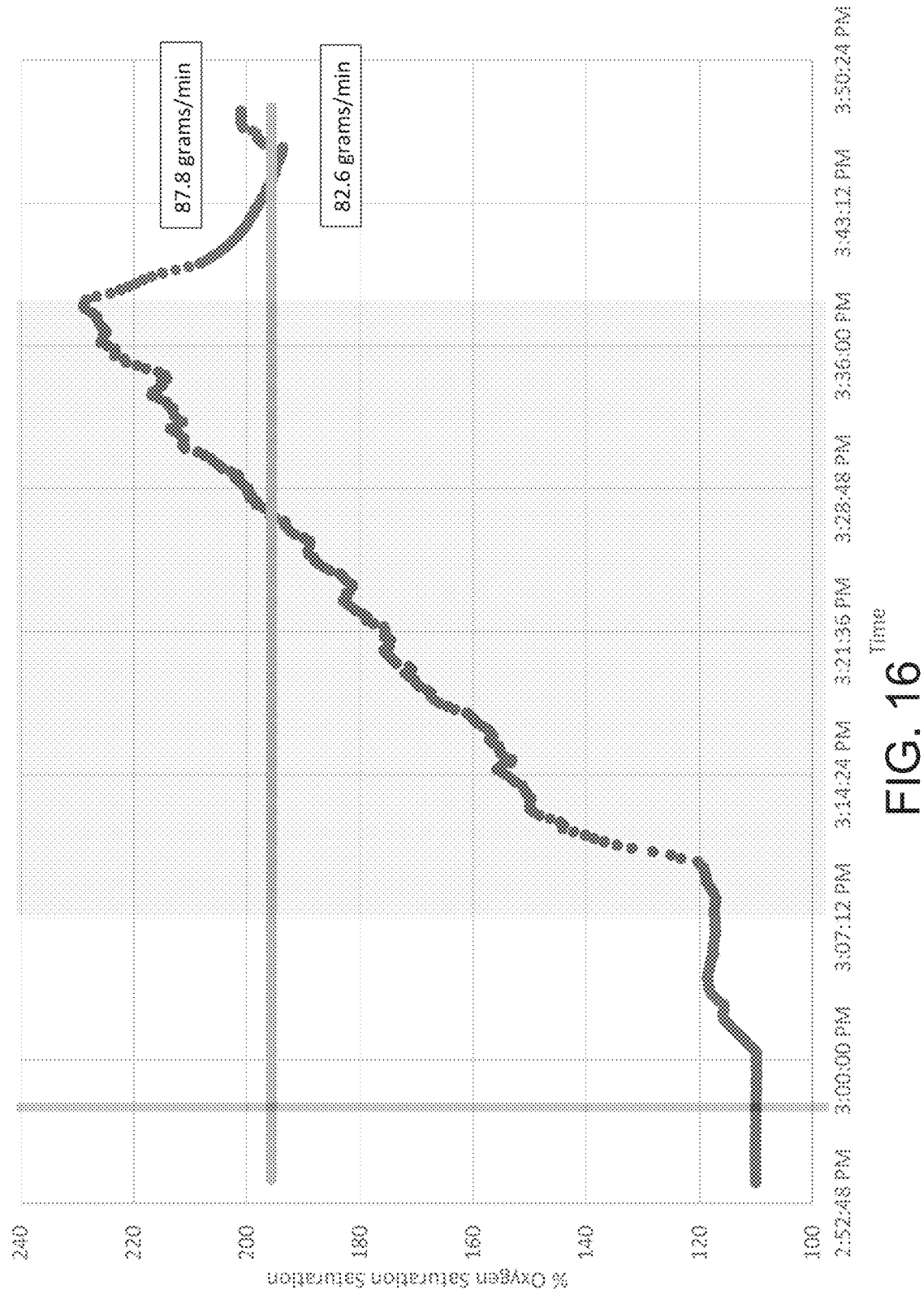
Figure 17:
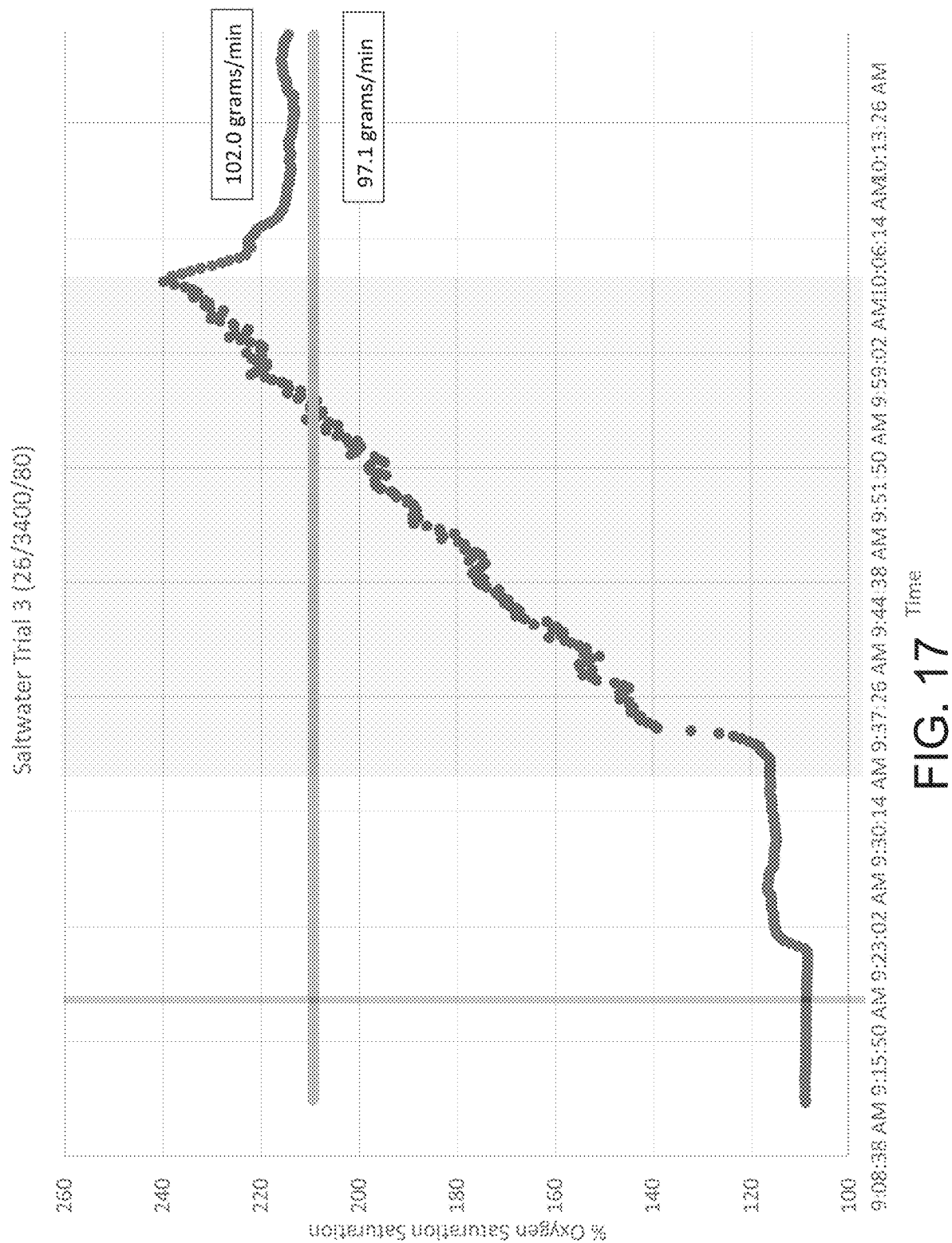
Figure 18:
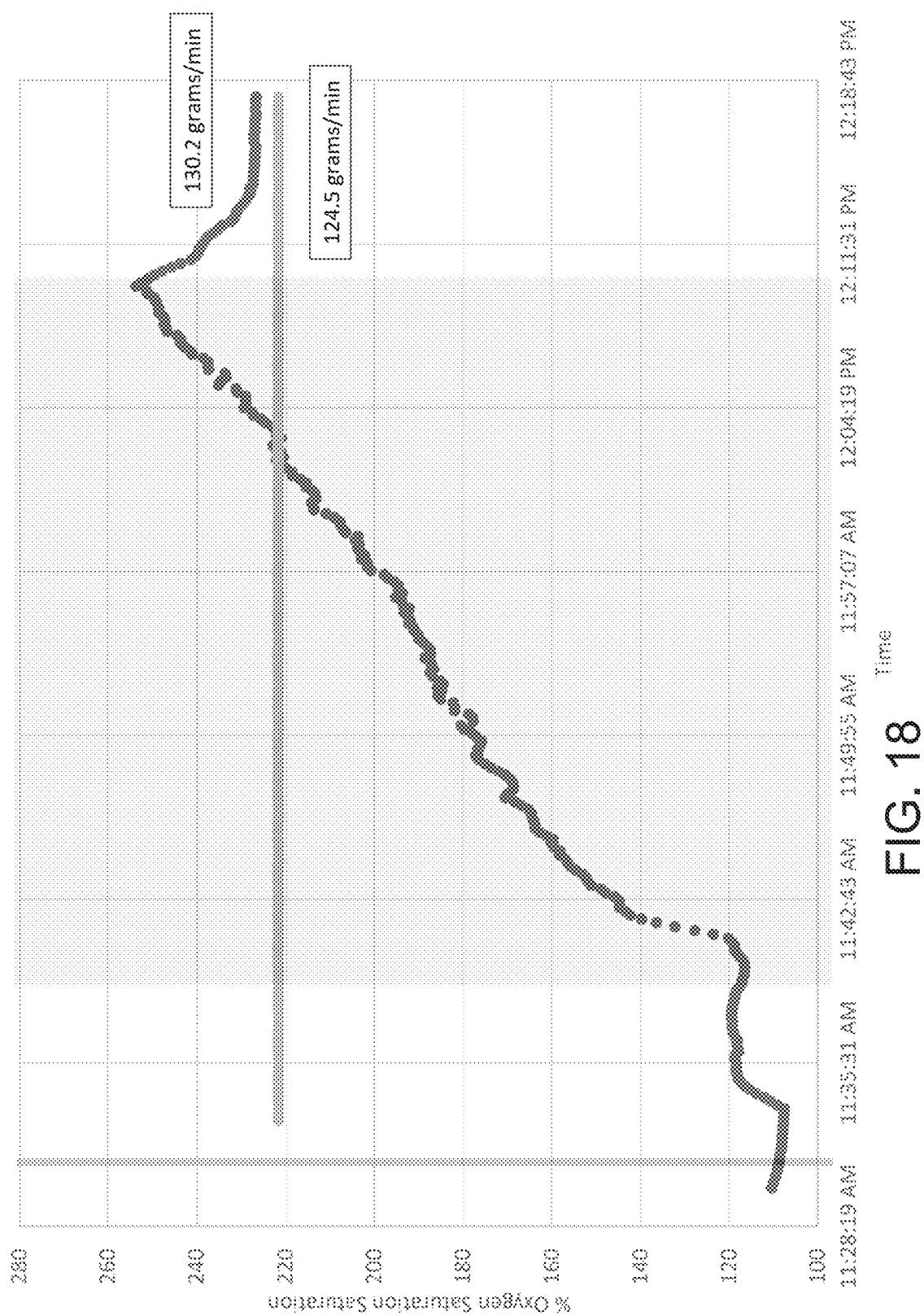
Figure 19:
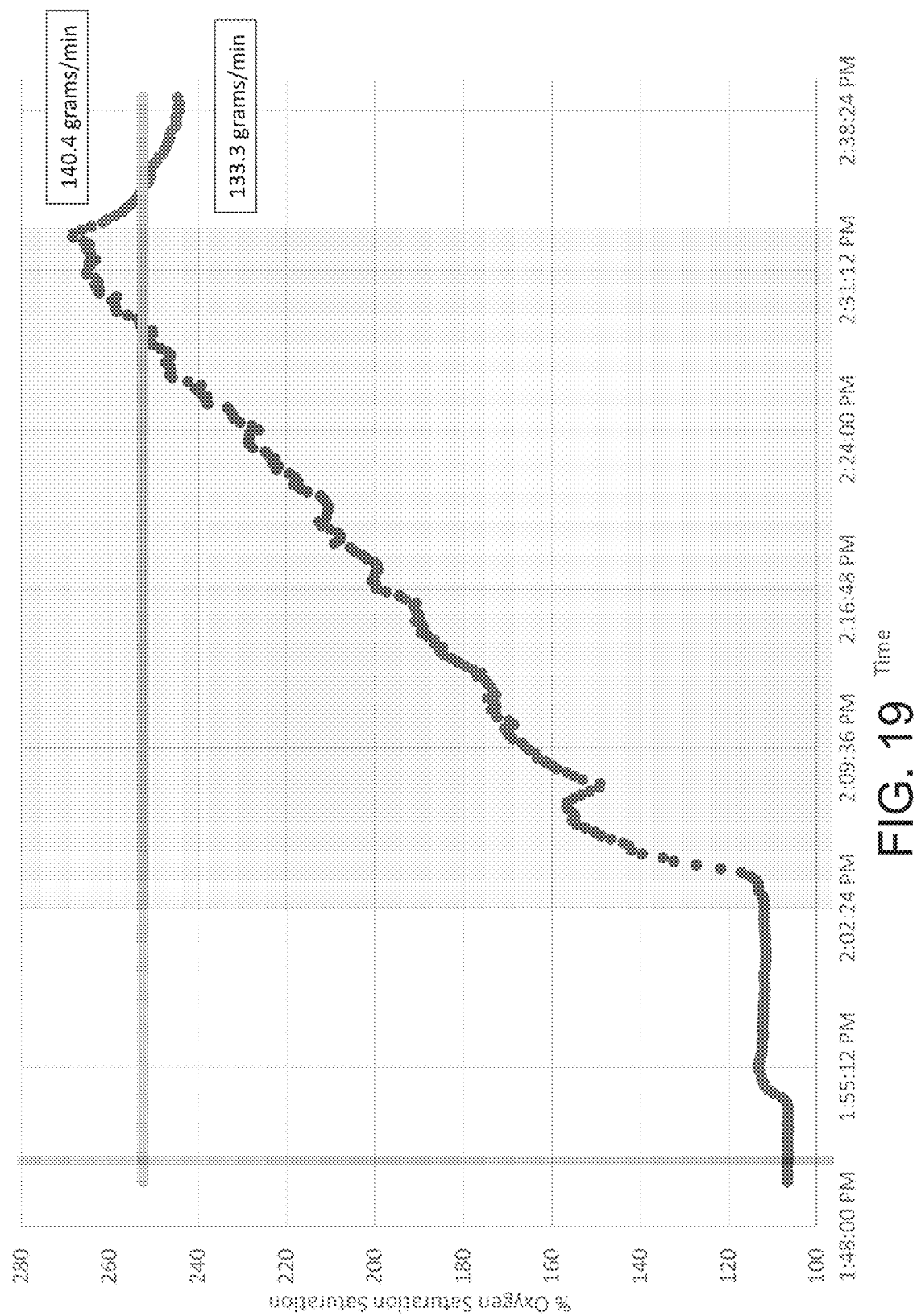
Figure 20:
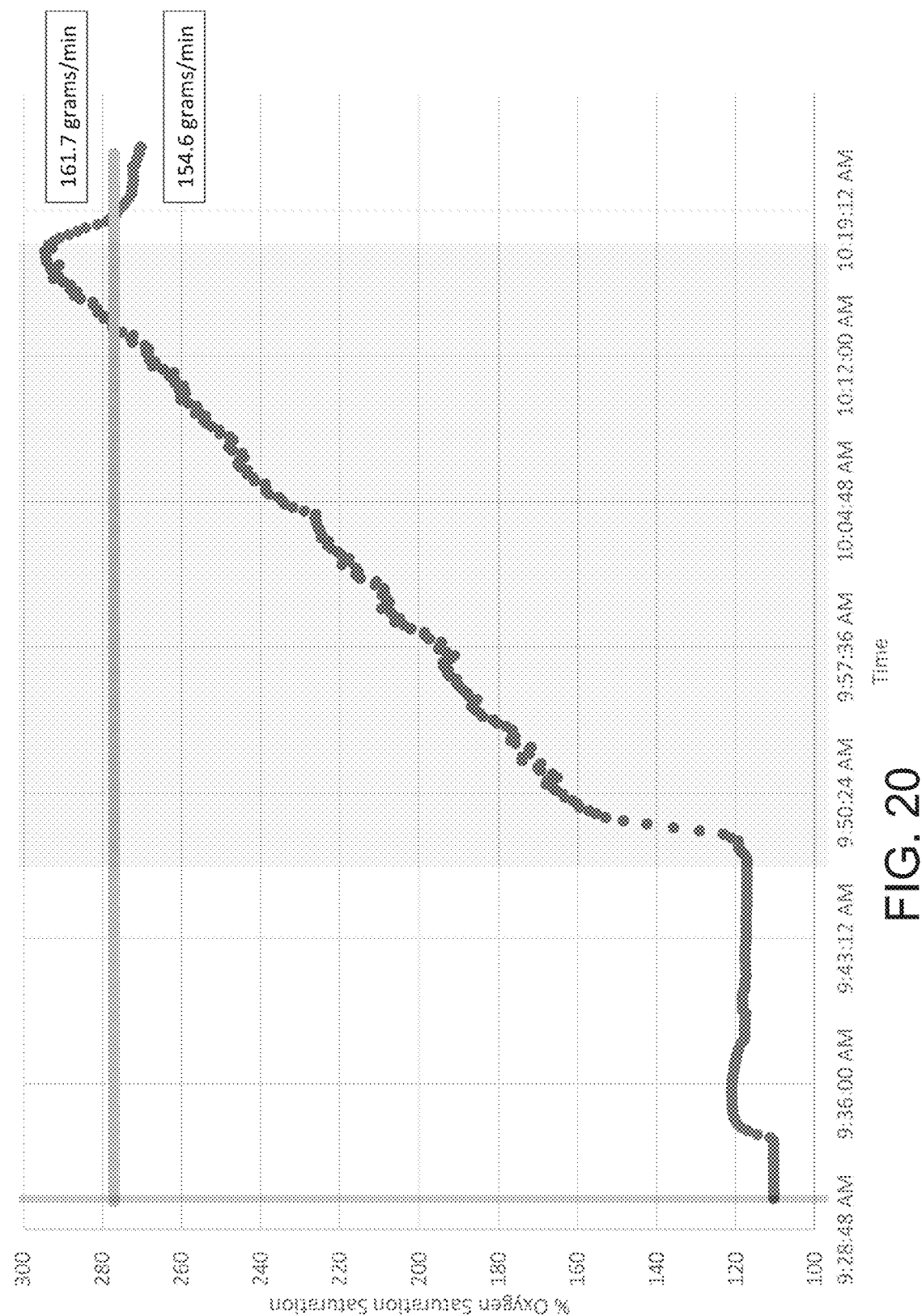
Figure 21:
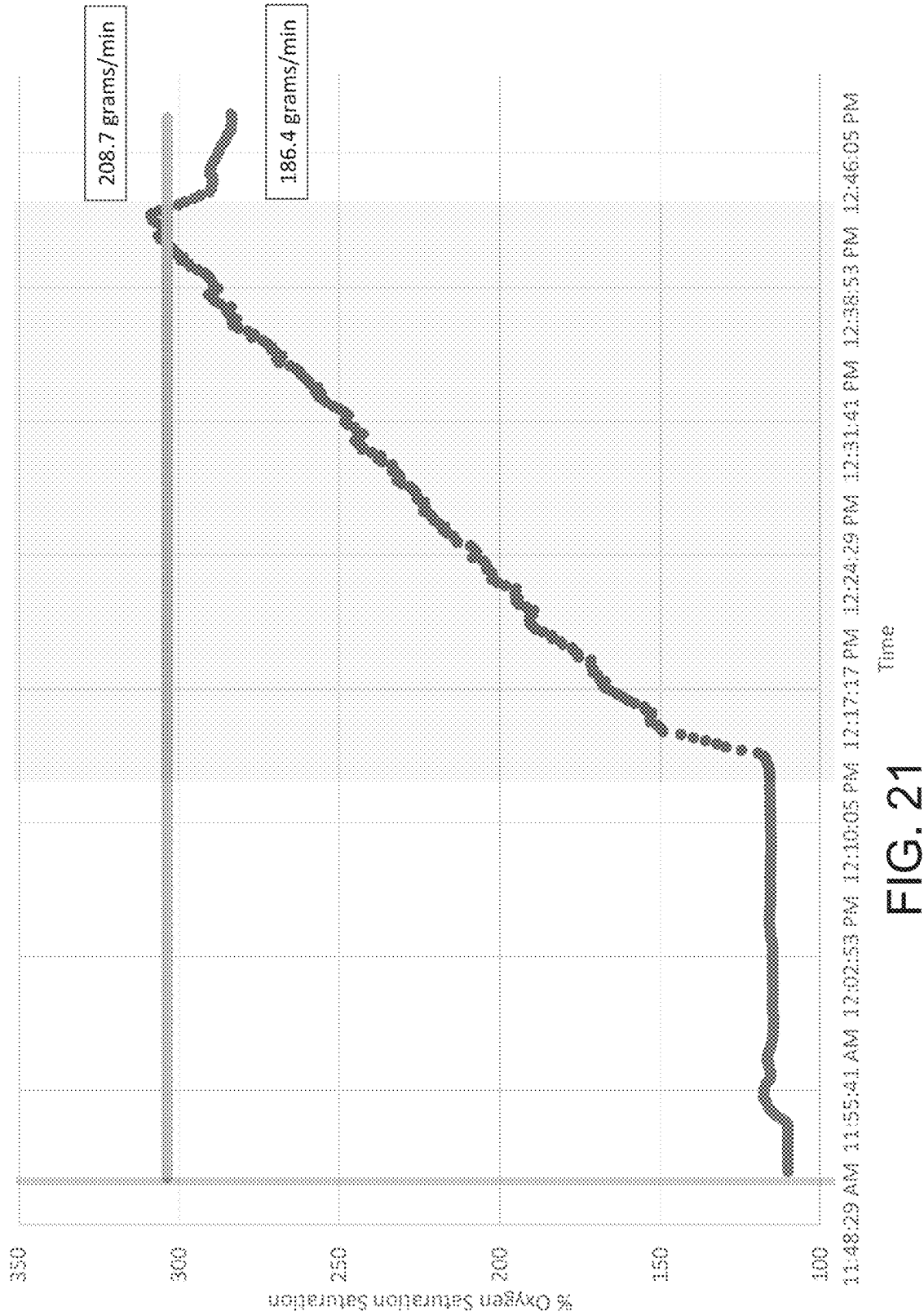
Figure 22:
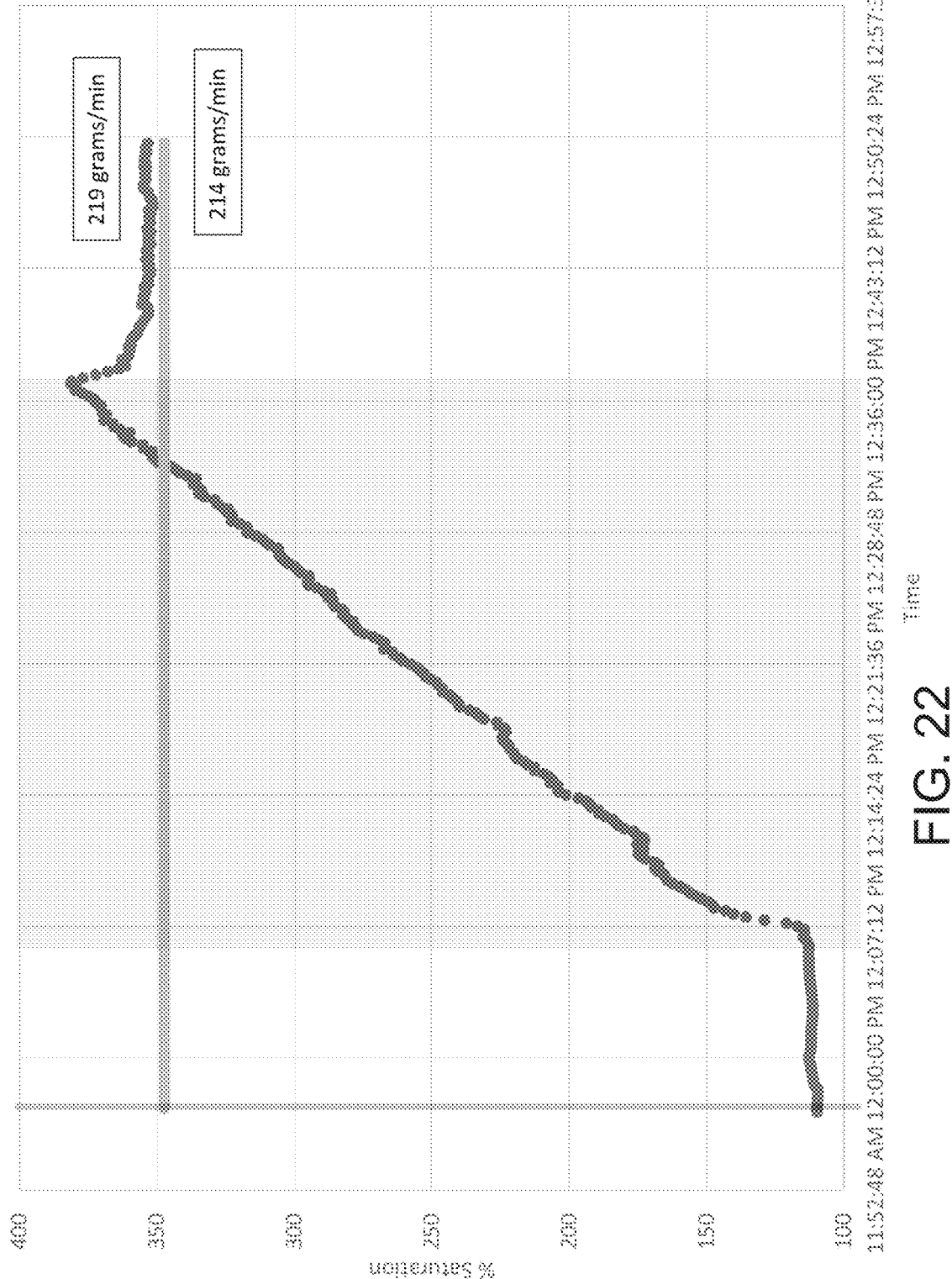
Figure 23:
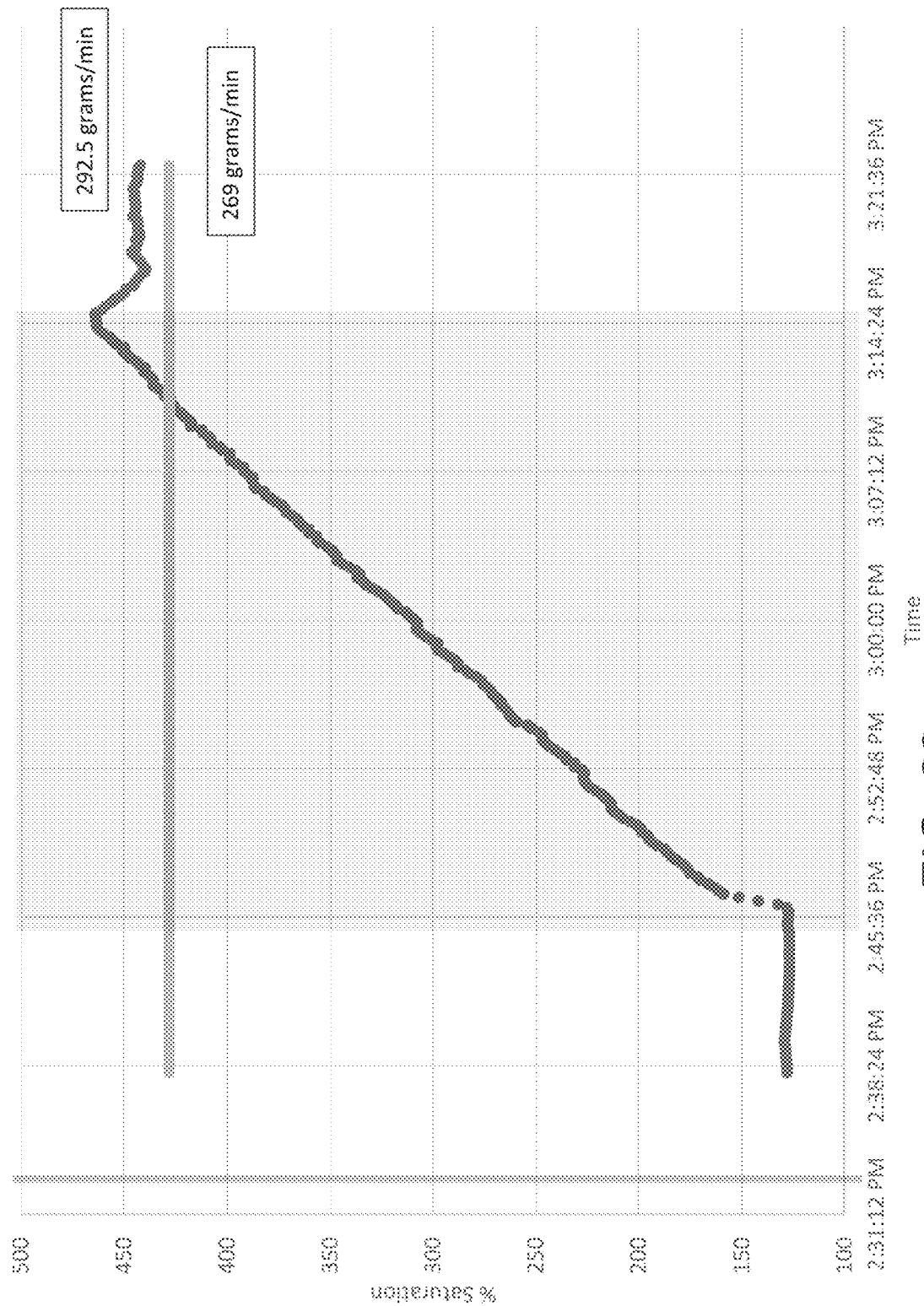
Figure 24:
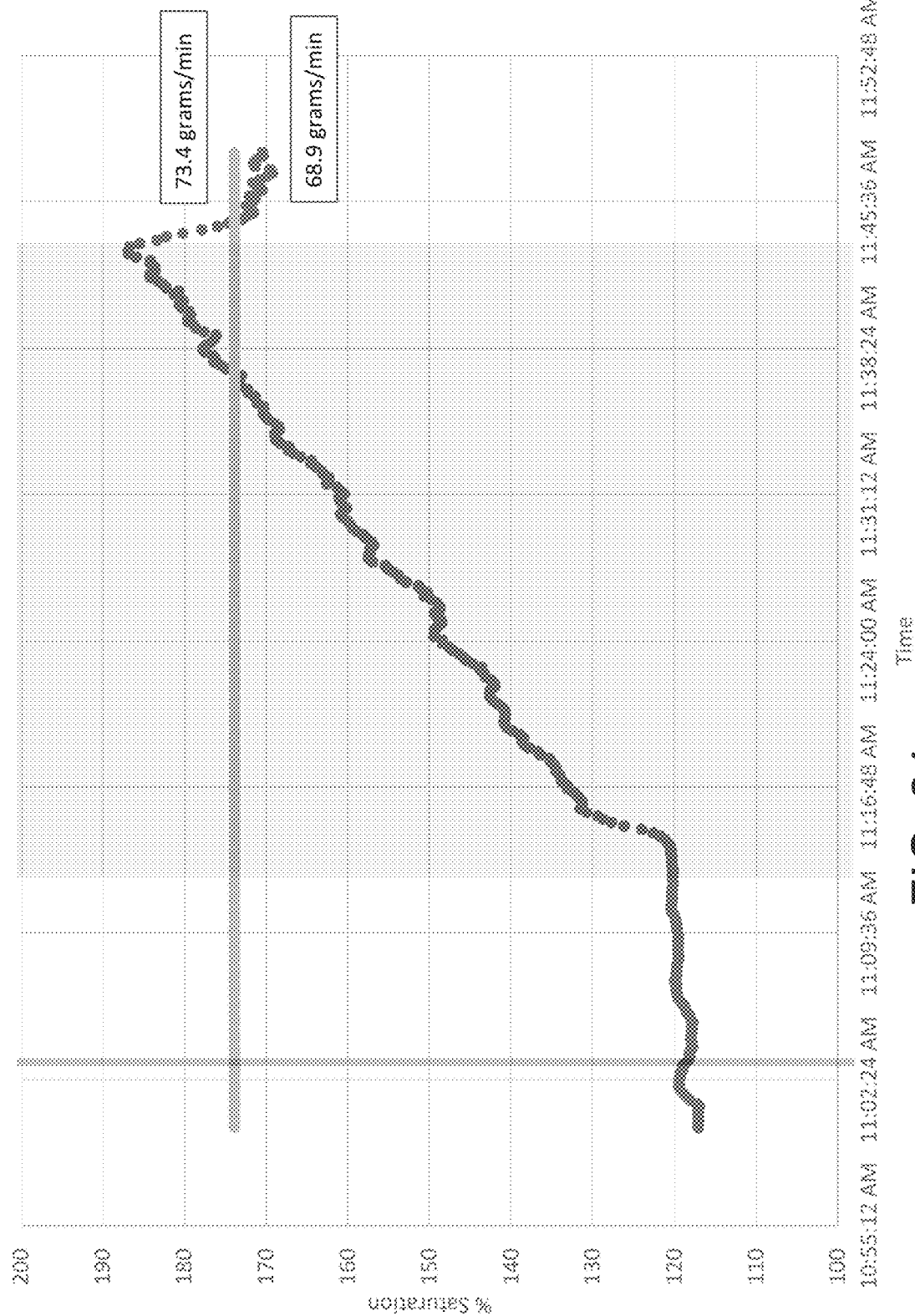
Figure 25:
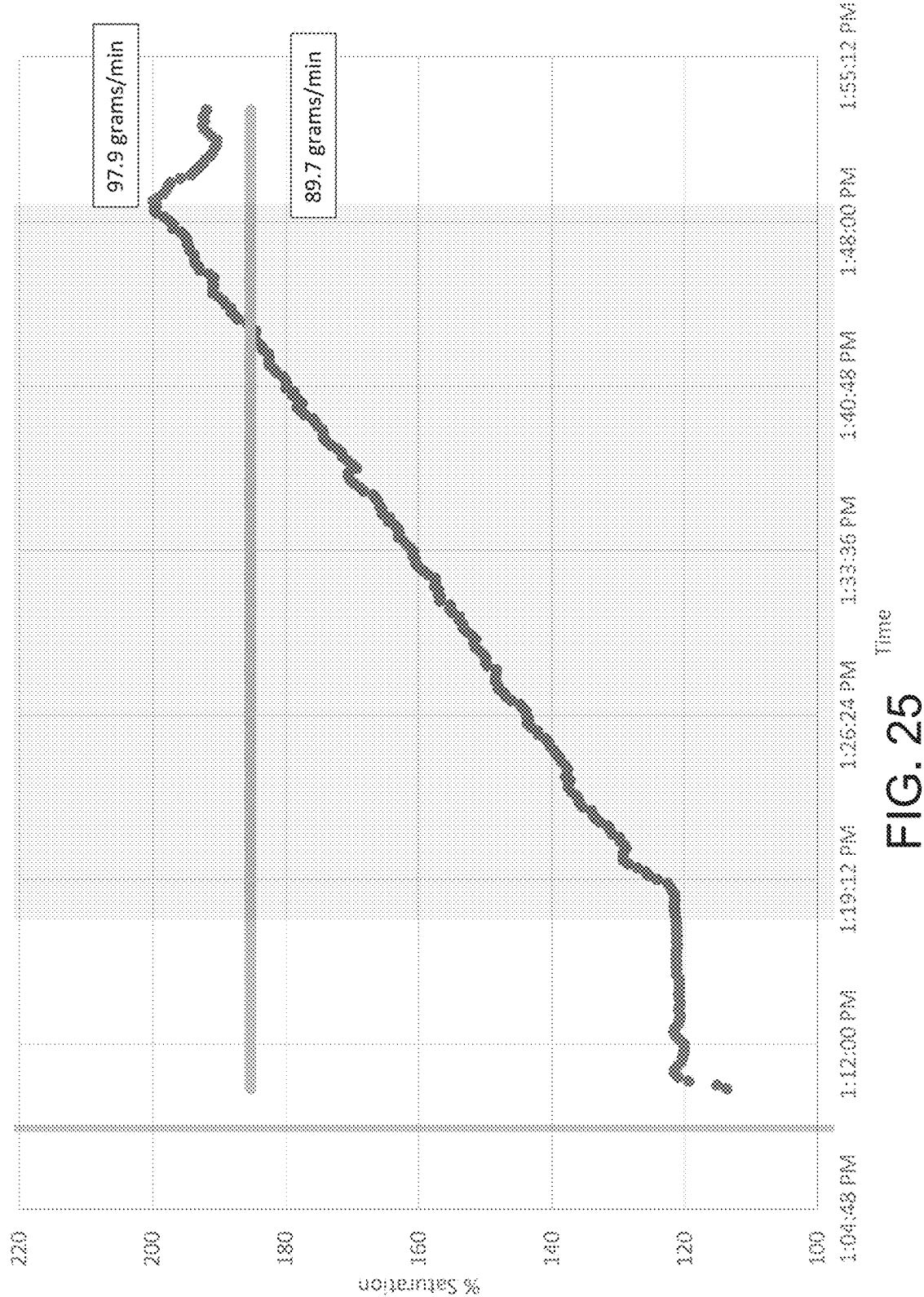
Figure 26:
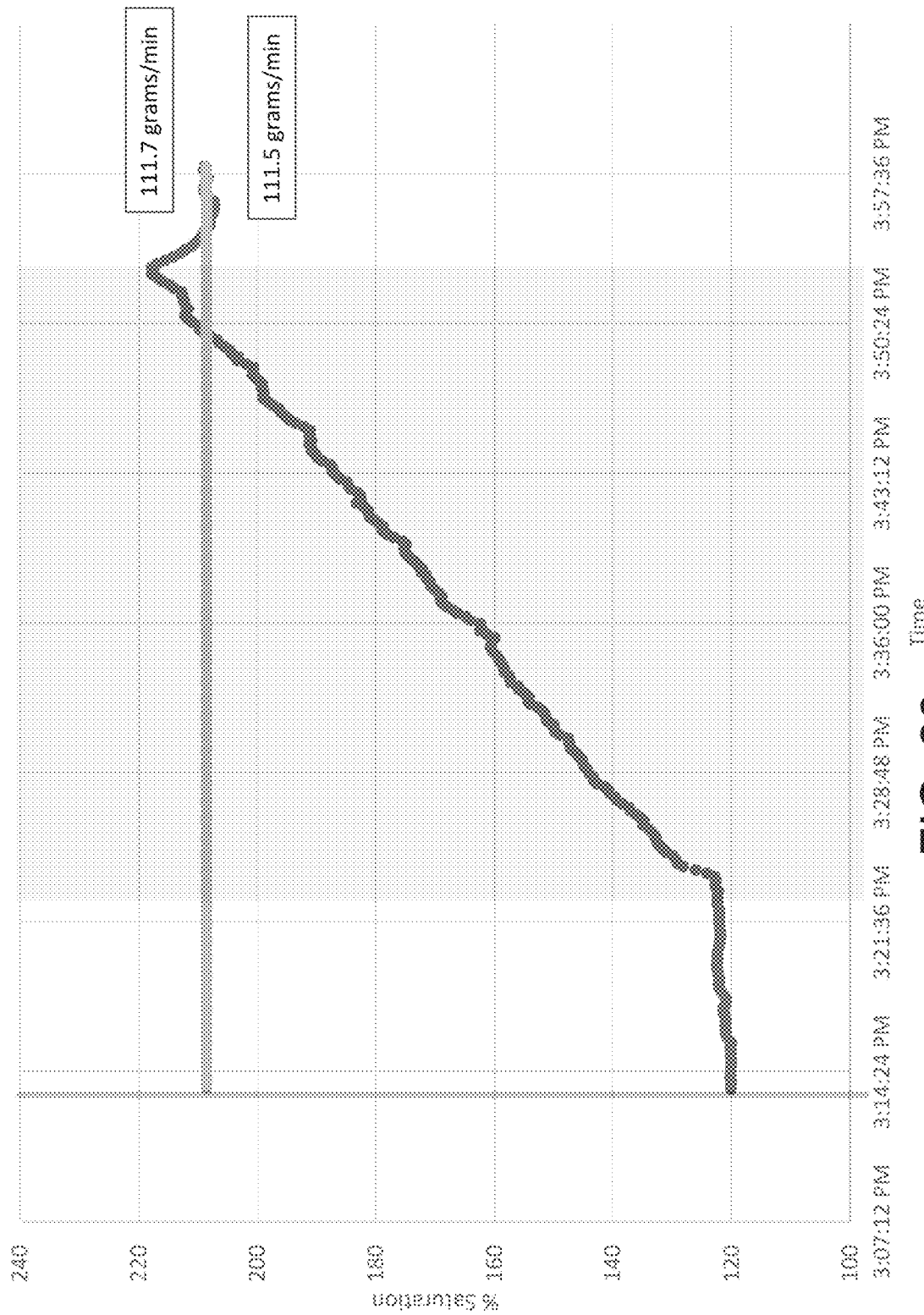
Figure 27:
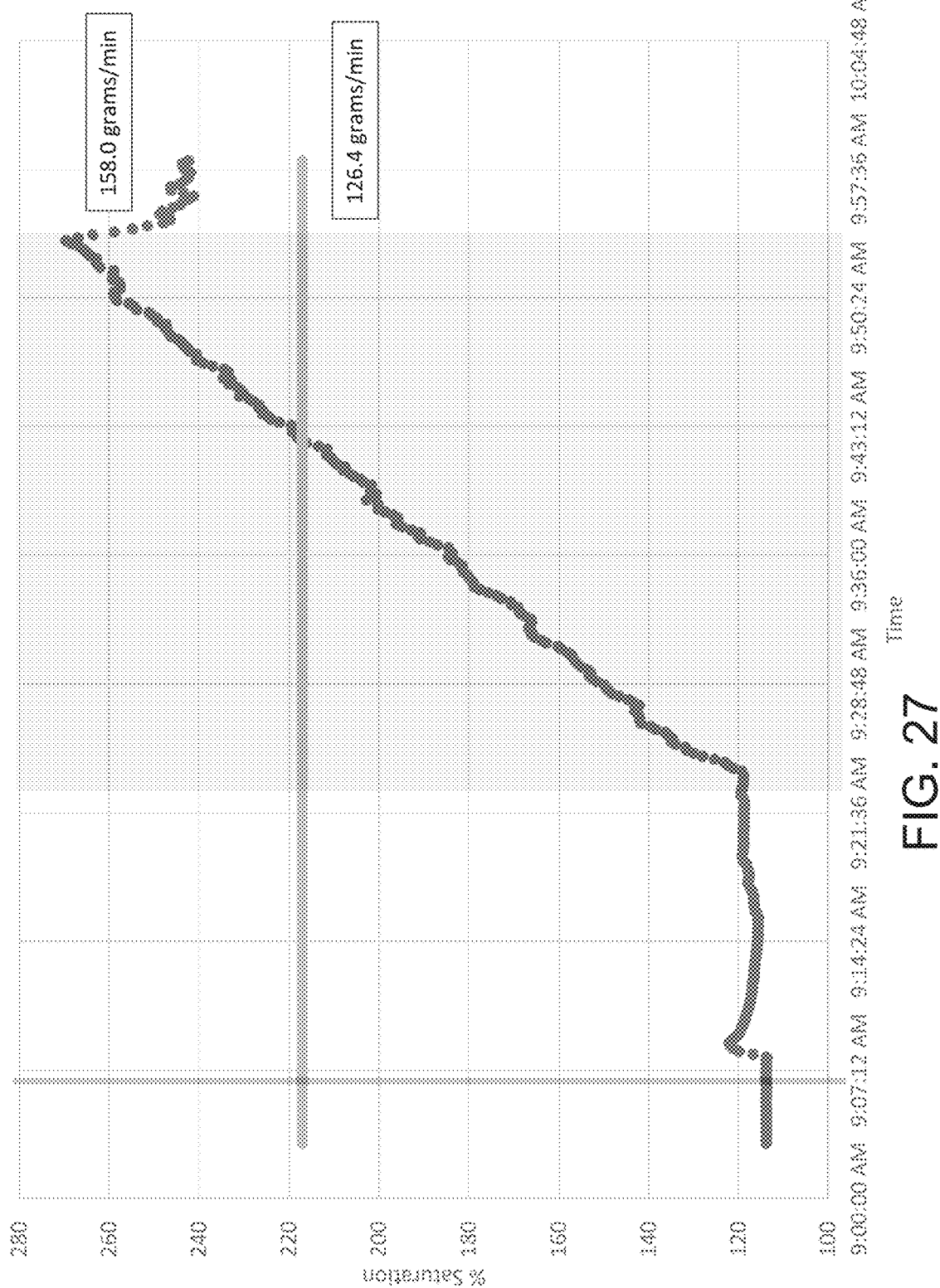
Figure 28:
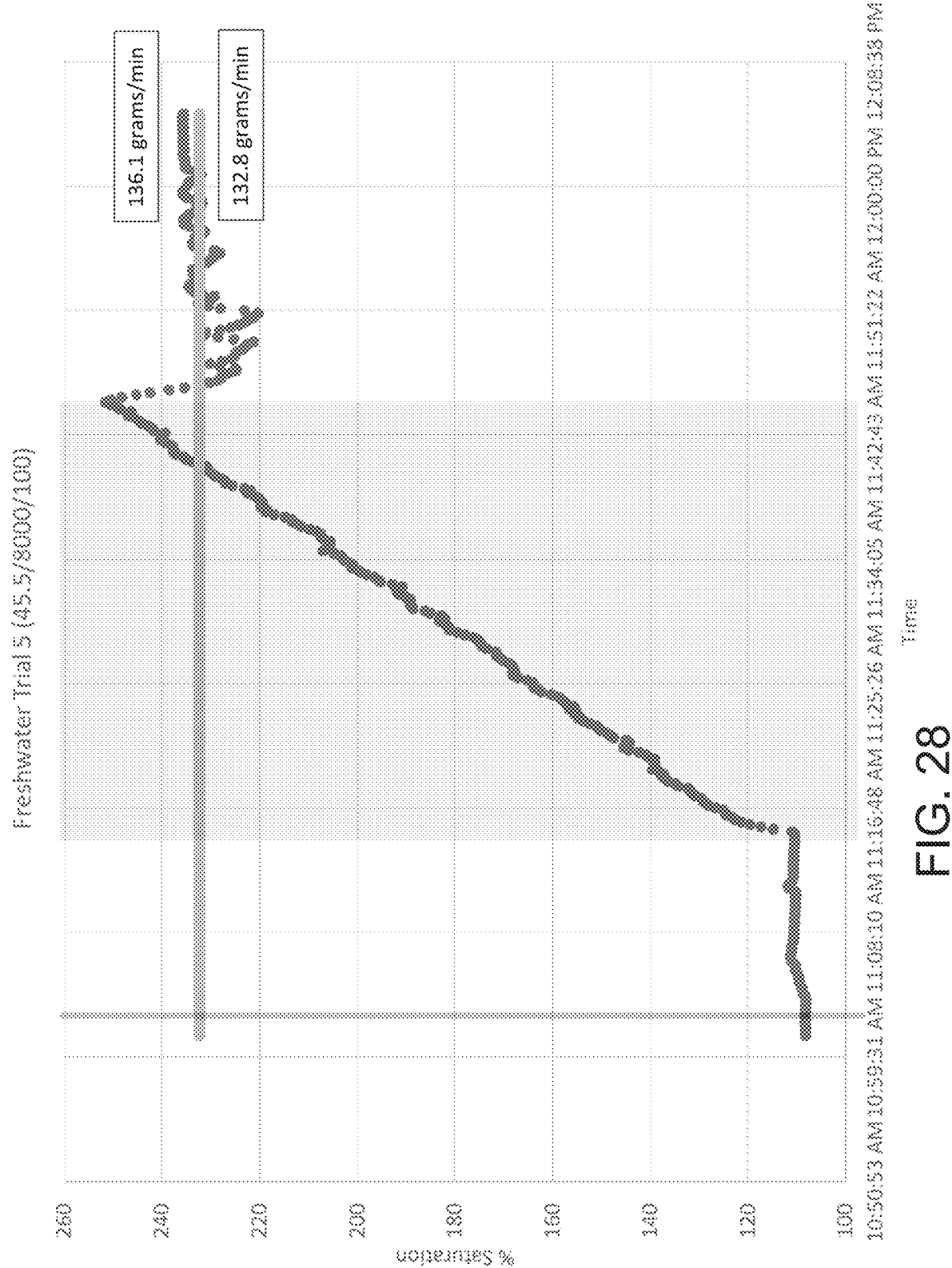

FIG. 9 is a sample graph explaining the elements of the graphs in the subsequent Figures.

A: Point at which the pump was turned on
B: Trial name indicating salinity, pressure in pounds per square inch, water flow in liters per minute and Oxygen flow in liters per minute (corrected for pressure)
C: Calculated grams of oxygen infused per minute
D: The theoretical value that should be obtained based on our internal models
E: Actual Oxygen percent saturation readings
F: Time during which Oxygen was added FIGS. 10-28 show percent saturation data using the saturator system of FIG. 6.

Trial 1: This test was preformed as a first attempt to replicate the most basic function of the unit in fresh water (FW) to see if it compared favorably to the models. See FIG. 10.
Trial 2: This test was preformed as an attempt to replicate the most basic function of the unit in fresh water at an known operating pressure for smaller units. See FIG. 11.
Trial 3a: This test was preformed to see if there was an issue with the right array. See FIG. 12.
Trial 3b: This test was preformed to see if there was an issue with the left array. See FIG. 13.
Trial 4: This test was preformed at an increased differential pressure in the arrays and an account taken for the volume of piping in the experiment. See FIG. 14.
Salt water (SW) trial 1: This test was preformed as a first attempt to replicate the most basic function of the unit in salt water at an increased differential to see if it compared favorably to the models. See FIG. 15.
SW trials 2, 3, 5, 7, 8, 9, 10, and 11: These trials were performed to push the limits of the device and see how accurate our current modeling system reflected reality in salt water. See FIGS. 16-23.
FW trials 1-5: These trials were performed to push the limits of the device and see how accurate our current modeling system reflected reality in fresh water. See FIGS. 24-28.

The outcome for the salt water and fresh water trials (corresponding to FIGS. 15-27) are also summarized in Table 1 below.

The tests show that levels of oxygen could be infused at levels not previously possible with conventional equipment while keeping the total gas pressure (TGP) relatively unchanged. For example, in Saltwater trial 11, the saturator system was operated at 65 internal psi, with water flow at 8000 L/min and oxygen flow at 245 L/min. While dissolved oxygen levels reached 447 percent saturation, the overall total gas pressure change was only 6.5 percent.

In comparison, existing saturator devices can only dissolve oxygen in water to reach 300 percent saturation, while the overall total gas pressure change is usually 140 percent, which is lethal to aquatic life.

As such, an advantage of the use of the present saturator system 10 and/or double array saturator system 100 is that the oxygen could be infused into the water at nearly ten times the amount of oxygen that would be infused by using the prior art saturator device while the total gas pressure in the liquid remains relatively unchanged.

Another advantage of the present saturator system is that it enables gas to be infused into an aqueous liquid under pressure with a high flow rate without increasing or significantly increasing the total gas pressure in the liquid.

The invention should be understood to be limited only by the accompanying claims, purposively construed.

TABLE 1

| Trial # | FW/SW | Temp (C.) | Water Flow (LPM) | Back Pressure (psi) | Rotameter (LPM) | Oxygen (LPM) | Recirc Pressure (psi) | Target O2 (gm/min) | Oxygen Delivered (gm/min) | Oxygen Delivered (LPM) | % TGP Change | Efficiency % | Final % DO |
|---|---|---|---|---|---|---|---|---|---|---|---|---|---|
| Apr. 16-19, 2018 | | | | | | | | | | | | | |
| 1 | SW | 19.17 | 3000 | 17.5 | 21 | 60 | 47.5 | 64.6 | 67 | 46.8 | 6 | 78 | 208 |
| 2 | SW | 17.34 | 3200 | 21.5 | 22.8 | 70 | 51.5 | 82.6 | 87.8 | 61.4 | 3.25 | 87.7 | 231 |
| 3 | SW | 17.08 | 3400 | 26 | 24.6 | 80 | 56 | 97.1 | 102 | 71.3 | 4.3 | 89.1 | 240 |
| 5 | SW | 10.24 | 3800 | 30.3 | 29.3 | 100 | 61 | 124.5 | 130.2 | 91.1 | 4.5 | 91.3 | 253 |
| 7 | SW | 17.28 | 4000 | 36.85 | 31.5 | 115 | 67 | 140.4 | 133.3 | 93.2 | 3.4 | 81.1 | 268 |
| 8 | SW | 16.91 | 4000 | 43.25 | 33.5 | 130 | 74 | 161.7 | 154.6 | 108.1 | 2.85 | 83.2 | 294 |
| 9 | SW | 11.44 | 4500 | 52 | 38.5 | 160 | 85 | 208.7 | 186.4 | 130.4 | 3.05 | 81.5 | 307 |
| May 2-4, 2018 | | | | | | | | | | | | | |
| 1 | FW | 11.3 | 4000 | 30.35 | 17.6 | 60 | 90 | 66 | 68 | 47.6 | 6 | 79.3 | 173 |
| 2 | FW | 11.6 | 6000 | 34.7 | 20 | 70 | 92 | 90 | 99 | 69.2 | 3.5 | 98.9 | 191 |
| 3 | FW | 12.1 | 8000 | 45.5 | 22 | 85 | 100 | 113.1 | 112.3 | 78.5 | 4.5 | 98.1 | 209.4 |
| 4 | FW | 12.5 | 8000 | 45.1 | 31.8 | 125 | 100 | 125 | 152 | 106.3 | 9 | 85.1 | 244 |
| 10 | SW | 19.1 | 6000 | 52 | 45.7 | 190 | 90 | 210 | 225 | 157.4 | 7 | 82.8 | 354 |
| 11 | SW | 19.2 | 8000 | 65 | 53.9 | 245 | 105 | 265 | 295 | 206.3 | 6.5 | 91.7 | 447 |

The invention claimed is:

1. An inline saturator system for gas exchange with an aqueous-phase liquid, the system comprising:
   a pressure vessel configured to receive a first liquid and a first gas from external sources, and to discharge a second liquid and a second gas from the pressure vessel;
   a gas infusion device situated within the pressure vessel, the gas infusion device configured to receive the first liquid and first gas, to facilitate gas exchange between the first liquid and first gas, producing the second liquid and the second gas, and to discharge the second liquid and second gas into the pressure vessel; and
   a recirculation system configured to redirect a portion of liquid within the pressure vessel back into the gas infusion device;
   wherein injection of the redirected liquid into the gas infusion device forces the first liquid into the gas infusion device for the gas exchange.

2. The saturator system of claim 1, wherein the recirculation system further comprises an eductor fluidly coupled to the gas infusion device, the injection of the redirected liquid through the eductor drawing the first liquid through the eductor into the gas infusion device.

3. The saturator system of claim 1, wherein the pressure vessel has:
   an input port for receiving the first liquid,
   an output port for discharging the second liquid from the pressure vessel,
   a gas inlet for receiving the first gas, and
   a gas outlet for discharging the second gas from the pressure vessel.

4. The saturator system of claim 1, wherein the gas infusion device has:
   a first portion for receiving the first liquid and discharging the second gas,
   an opposed second portion for receiving the first gas and discharging the second liquid into the pressure vessel, and
   a fibre module array situated therebetween for facilitating the gas exchange between the first liquid and the first gas to produce the second liquid and the second gas.

5. The saturator system of claim 4, further comprising a baffle:
   situated within the pressure vessel, and
   configured to direct the first liquid from the input port of the pressure vessel to the first portion of the gas infusion device.

6. The saturator system of claim 5, wherein the recirculation system comprises:
   a suction nozzle and a discharge nozzle, both in fluid communication with the pressure vessel, and
   a pump operatively coupled between the suction nozzle and the discharge nozzle, the pump for driving fluid from the suction nozzle to the discharge nozzle.

7. The saturator system of claim 6, wherein
   the suction nozzle is positioned proximate the second portion of the gas infusion device to draw a portion of liquid into the recirculation system, and
   the discharge nozzle is positioned adjacent the first portion of the gas infusion device to inject the portion of liquid into the gas infusion device.

8. The saturator system of claim 7, wherein the pressure vessel comprises a steel alloy.

9. The saturator system of claim 7, wherein the pressure vessel has one or more pressure-rated doors with seals to allow for cleaning and maintaining of components inside the pressure vessel.

10. The saturator system of claim 9, further comprising a back-pressure control valve positioned upstream of the output port for maintaining fluid pressure within the pressure vessel.

11. The saturator system of claim 10, wherein the pump of the recirculation system is configured to generate a pressure of at least 20 psi through the gas infusion device.

12. The saturator system of claim 11, further comprising a second gas infusion device positioned within the pressure vessel.

13. The saturator system of claim 12, wherein the recirculation system includes a second discharge nozzle positioned adjacent the second gas infusion device to inject liquid into the second gas infusion device.

14. The saturator system of claim 13, wherein the recirculation system includes a second eductor coupled between the second discharge nozzle and the second gas infusion device.

15. The saturator system of claim 14, wherein the recirculation system includes a second pump in fluid communication with the second discharge nozzle.

16. The saturator system of claim 14, further comprising:
   a second pressure vessel configured to receive the first liquid and the first gas from external sources, and to discharge the second liquid and the second gas from the second pressure vessel;
   a third gas infusion device situated within the second pressure vessel, the third gas infusion device configured to receive the first liquid and first gas, to facilitate gas exchange between the first liquid and first gas, producing the second liquid and the second gas, and to discharge the second liquid and second gas into the second pressure vessel; and
   the recirculation system further configured to redirect a portion of liquid within the second pressure vessel back into the third gas infusion device;
   wherein injection of the redirected liquid into the third gas infusion device forces the first liquid in the second pressure vessel into the third gas infusion device for the gas exchange.

17. A method for gas exchange with an aqueous-phase liquid, the method comprising:
   injecting a first liquid and a first gas into a pressure vessel;
   directing the first liquid and the first gas through a gas infusion device situated within the pressure vessel, the gas infusion device configured to facilitate gas exchange between the first liquid and the first gas, producing a second liquid and a second gas;
   redirecting a portion of the second liquid back into the gas infusion device; and
   discharging the remaining second liquid out of the pressure vessel; wherein the redirection of the second liquid into the gas infusion device draws the first liquid into the gas infusion device for the gas exchange.

18. The method of claim 17, wherein the redirecting includes pumping the portion of second liquid into the gas infusion device through an eductor, thereby drawing the first liquid within the pressure vessel through the eductor into the gas infusion device.

19. The method of claim 18, further comprising maintaining the pressure within the gas infusion device at a predetermined level.

20. The method of claim 19, wherein the predetermined pressure maintained within the gas infusion device is at least 20 psi.

\* \* \* \* \*